US011859800B2

(12) United States Patent
Mathews et al.

(10) Patent No.: US 11,859,800 B2
(45) Date of Patent: Jan. 2, 2024

(54) ADJUSTABLE AND/OR RECESSED LIGHT FIXTURES AND RELATED COMPONENTS AND METHODS

(71) Applicant: Lucifer Lighting Company, San Antonio, TX (US)

(72) Inventors: Ben Mathews, San Antonio, TX (US); Scott Bell, San Antonio, TX (US)

(73) Assignee: LUCIFER LIGHTING COMPANY, San Antonio, TX (US)

( * ) Notice: Subject to any disclaimer, the term of this patent is extended or adjusted under 35 U.S.C. 154(b) by 0 days.

(21) Appl. No.: 17/656,837

(22) Filed: Mar. 28, 2022

(65) Prior Publication Data

US 2023/0045469 A1 Feb. 9, 2023

Related U.S. Application Data

(63) Continuation of application No. 17/085,909, filed on Oct. 30, 2020, now Pat. No. 11,287,119, which is a (Continued)

(51) Int. Cl.

| | |
|---|---|
| ***F21V 21/30*** | (2006.01) |
| ***F21S 8/02*** | (2006.01) |
| *F21V 21/04* | (2006.01) |

(52) U.S. Cl.

CPC ................ *F21V 21/30* (2013.01); *F21S 8/02* (2013.01); *F21V 21/04* (2013.01)

(58) Field of Classification Search

CPC ............................... F21V 17/107; F21V 21/30

See application file for complete search history.

(56) References Cited

U.S. PATENT DOCUMENTS

| | | |
|---|---|---|
| D234,710 S | 4/1975 | Beeren |
| 4,048,491 A | 9/1977 | Wessman |

(Continued)

FOREIGN PATENT DOCUMENTS

| | | |
|---|---|---|
| DE | 202009000699 | 3/2009 |
| DE | 102008055864 | 5/2010 |

(Continued)

OTHER PUBLICATIONS

Archi Expo, "LED track-light (adjustable)—STAR : 55 QPAR 51 DLR—BRUCK", accessed Apr. 8, 2014, 35 pages, htt;://www.archiexpo.com/prod/bruck/led-track-lights-adjustables-53105-1124273.html.

(Continued)

*Primary Examiner* — Andrew J Coughlin

(74) *Attorney, Agent, or Firm* — Norton Rose Fulbright US LLP

(57) ABSTRACT

Some embodiments of the present fixtures include a mechanical actuator configured to direct movement of a light mount along an arcuate path defined by arcuate bearing surface(s). Some embodiments of the present fixtures include a rotatable portion coupled to a stationary portion at an interface that is at least partially defined by smooth surface(s). Some embodiments of the present mounts include a base having a sidewall that defines an outer perimeter and mounting tab(s), each movable between a deployed state and a retracted state in which at least a portion of the mounting tab is disposed within the outer perimeter. Some embodiments of the present removable shroud assemblies include a lens coupled to a second end of a shroud and movable from a first position to a second position in which a portion of the lens is not in contact with the second end of the shroud.

20 Claims, 26 Drawing Sheets

Related U.S. Application Data continuation of application No. 16/429,987, filed on Jun. 3, 2019, now Pat. No. 10,851,977, which is a continuation of application No. 14/970,927, filed on Dec. 16, 2015, now Pat. No. 10,344,958.

(60) Provisional application No. 62/092,804, filed on Dec. 16, 2014.

(56) References Cited

U.S. PATENT DOCUMENTS

| | | | | |
|---|---|---|---|---|
| D253,853 | S | 1/1980 | Gerber | |
| 5,289,358 | A | 2/1994 | Halemeier | |
| 6,079,992 | A | 6/2000 | Kuchar et al. | |
| 6,082,878 | A | 7/2000 | Doubek et al. | |
| D592,791 | S | 5/2009 | Sabernig | |
| 7,559,677 | B1 | 7/2009 | Dupre | |
| 7,762,688 | B2 | 7/2010 | Dixon et al. | |
| D646,821 | S | 10/2011 | Wauters | |
| D655,841 | S | 3/2012 | Coleman | |
| D664,279 | S | 7/2012 | Meise et al. | |
| D697,245 | S | 1/2014 | Thomas et al. | |
| D703,359 | S | 4/2014 | Thomas et al. | |
| 9,157,609 | B2 | 10/2015 | Littman Gatof et al. | |
| 9,239,149 | B2 | 1/2016 | Vice | |
| 9,593,829 | B2 | 3/2017 | Dupre et al. | |
| 2003/0007354 | A1 | 1/2003 | Schubert et al. | |
| 2003/0021109 | A1* | 1/2003 | Matthews | F21V 17/107 362/202 |
| 2005/0207146 | A1 | 9/2005 | Reggiani | |
| 2005/0258326 | A1 | 11/2005 | St-Pierre | |
| 2006/0146536 | A1* | 7/2006 | Laenen | B64F 1/20 362/269 |
| 2008/0186718 | A1* | 8/2008 | Magisano | F21V 21/043 362/366 |
| 2009/0296412 | A1 | 12/2009 | Ogawa et al. | |
| 2010/0002451 | A1* | 1/2010 | Reynolds | F21S 8/02 362/363 |
| 2010/0149822 | A1* | 6/2010 | Cogliano | F21V 21/30 362/365 |
| 2011/0164422 | A1 | 7/2011 | Chan | |
| 2011/0267826 | A1 | 11/2011 | Santiago et al. | |
| 2012/0287625 | A1 | 11/2012 | Macwan et al. | |
| 2013/0163243 | A1 | 6/2013 | Reed | |
| 2013/0170232 | A1 | 7/2013 | Park et al. | |
| 2014/0085912 | A1 | 3/2014 | David et al. | |
| 2014/0254176 | A1 | 9/2014 | Schmitt et al. | |
| 2014/0268836 | A1 | 9/2014 | Thompson | |
| 2015/0078012 | A1 | 3/2015 | Delano | |
| 2015/0219317 | A1 | 8/2015 | Littman Gatof et al. | |
| 2015/0241038 | A1 | 8/2015 | Fryzek | |
| 2015/0241039 | A1 | 8/2015 | Fryzek | |
| 2016/0186967 | A1* | 6/2016 | Mathews | F21S 8/02 362/372 |
| 2018/0017237 | A1 | 1/2018 | Dupre et al. | |

FOREIGN PATENT DOCUMENTS

| | | |
|---|---|---|
| DE | 202013104140 | 9/2013 |
| EP | 1293724 | 9/2003 |
| EP | 1657486 | 5/2006 |
| GB | 870482 | 6/1961 |
| JP | 2003-297136 | 10/2003 |
| JP | 1232045 | 3/2005 |
| JP | 2008-047448 | 2/2008 |
| JP | 2008-218188 | 9/2008 |
| TW | 286228 | 9/1996 |
| TW | 287875 | 10/1996 |
| TW | 201107811 | 3/2011 |
| TW | 144227 | 12/2011 |
| TW | 201207289 | 2/2012 |
| WO | WO 2012/111983 | 8/2012 |

OTHER PUBLICATIONS

Bulb.com, “One Light Adjustable Wall or Ceiling Heat Lamp Fixture with Black Baffle, White Finish”, accessed Apr. 8, 2014, 1 page, http://www.bulbs.com/espec.aspx?ID=17518.
Cooper Industries, “Cooper Lighting by EATON”, 12 pages, 2013, http://www.cooperindustries.com/content/public/en/lighting/products/indoor_ceiling_wall_mount_lighting/ceiling_mount/_165822.html.
Deltalight®, “Installation Instructions for You-Turn On H111-35”, 3 pages, Jan. 10, 2013, www.deltalight.com.
Extended European Search Report Issued in Corresponding PCT Application No. 15870981.6, dated May 29, 2018.
Installation instruction for You-Turn On H111-35. http://deltalight.com/downloads/manual/6_313_02_1935_HAND.pdf.
International Search Report and Written Opinion issued in PCT/US2015/066083, dated Mar. 31, 2016.
Kurt Versen, “Narrow, Medium, Wide Distribution Surface Form, 5" Diameter”, 2014, www.kurtversen.com/products/1137_1135_1133/.
Search Report and Written Opinion issued in International Application No. PCT/US2014/034968.
Taiwanese Office Action and Search Report dated Feb. 6, 2015 for corresponding application No. 103302951 filed May 16, 2014.
Taiwanese Office Action and Search Report Issued in Corresponding Taiwan Patent Application No. 104142324, dated Nov. 28, 2019.

* cited by examiner

FIG. 1D
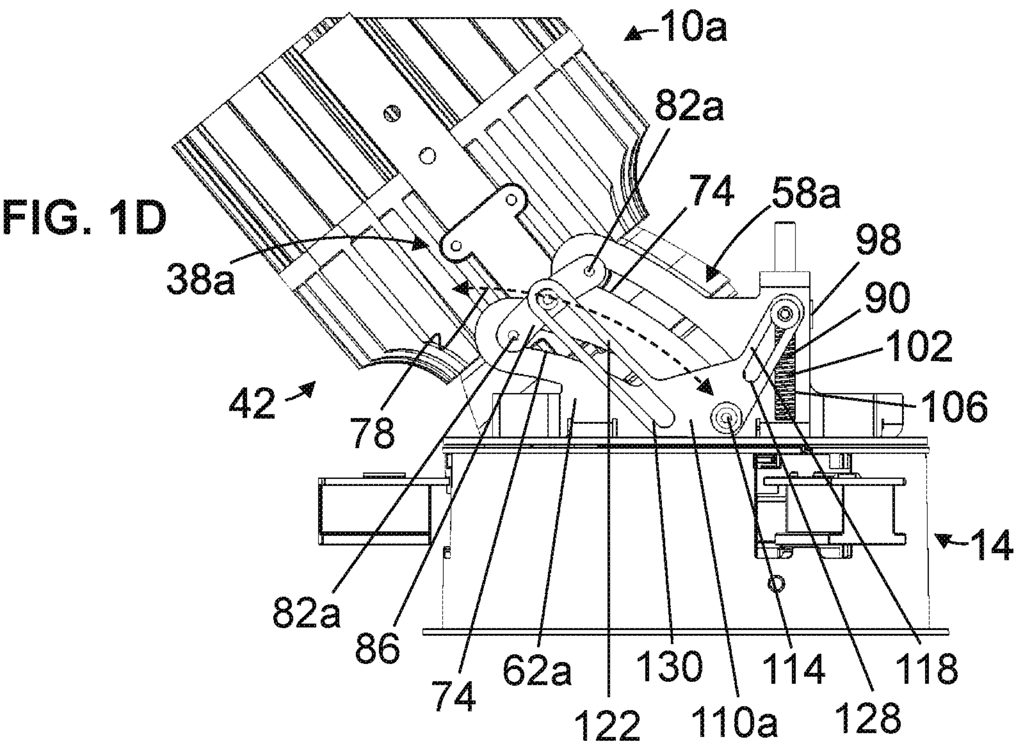
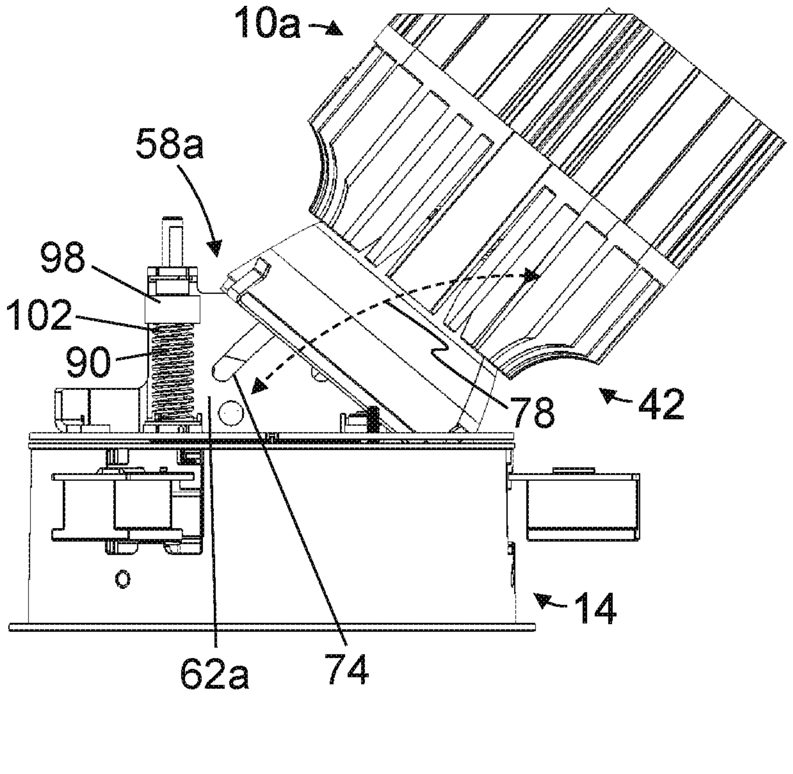
FIG. 1E

ADJUSTABLE AND/OR RECESSED LIGHT FIXTURES AND RELATED COMPONENTS AND METHODS

CROSS-REFERENCE TO RELATED APPLICATIONS

This application is a continuation of U.S. patent application Ser. No. 17/085,909, filed Oct. 30, 2020, which is a continuation of U.S. patent application Ser. No. 16/429,987, filed Jun. 3, 2019, which is a continuation of U.S. patent application Ser. No. 14/970,927, filed Dec. 16, 2015, which claims priority to and the benefit of U.S. Provisional Patent Application No. 62/092,804, filed Dec. 16, 2014, the contents of which applications are incorporated by reference in their entireties.

BACKGROUND

1. Field of Invention

The present invention relates generally to light fixtures, and more specifically, but not by way of limitation, to adjustable and/or recessed light fixtures.

2. Description of Related Art

An adjustable light fixture may allow for a level of control over some aspect of light output from the fixture (e.g., by allowing tilting and/or swiveling of a light source of the fixture relative to other components of the fixture to adjust a direction of light output by the fixture). Such fixtures may be recessed into a structure (e.g., at least partially disposed within a wall, ceiling, floor, other structure, and/or the like).

Typical tilting fixtures are often susceptible to various issues. For example, such tilting fixtures may involve mechanisms that, during tilting of a light source, cause other, undesirable movements of the light source (e.g., rolling, yawing, undesired lateral translation, and/or the like). Such mechanisms may be prone to binding and/or falling out of adjustment. Especially for recessed fixtures, known tilting mechanisms are often relatively large and complex (e.g., involving many moving parts), which may complicate the installation of a tilting fixture including such a tilting mechanism (e.g., by requiring a relatively large opening in a wall, ceiling, floor, and/or the like to accommodate the tilting fixture and/or correspondingly large trim or patching to cover gaps).

Typical swiveling fixtures often also exhibit undesirable qualities. For example, such swiveling fixtures may involve swiveling mechanisms that provide non-smooth (e.g., jerky or inconsistent) feel to swiveling adjustments (e.g., involving meshing gears, interfacing rough surfaces, and/or the like). Additionally, such swiveling mechanisms may require considerable effort to adjust and may be prone to falling out of adjustment. Some existing swiveling mechanisms may be relatively large and complex, which may complicate the installation of swiveling fixtures including such swiveling mechanisms (e.g., similarly as to described above).

Some recessed light fixtures are designed to be recessed into a structure, which typically involves the use of a mount. Some existing mounts may require access to both sides of a structure (e.g., ceiling) within which a fixture is to be mounted (in some instances, such access may be impossible without a significant increase in installation time and/or cost). Other mounts may be designed to install a fixture without requiring such access, but often require mounting hardware to be disposed on an exterior surface of and extending laterally outward, which must be passed through the structure in which the fixture is to be mounted. Thus, such mounts may require an undesirably larger hole in the structure (e.g., and/or use of such mounts may necessitate a relatively large trim or "goof" ring).

In general, it may be desirable to access certain components of a light fixture once the light fixture is installed (e.g., for adjustment, maintenance, and/or the like). Perhaps particularly for a recessed fixture, access to such components may be limited (e.g., due to the placement of the fixture within a wall, ceiling, floor, and/or the like). As a further complication, in some instances, a lens or other optical element may be disposed in front of the light source. While some fixtures may include removable lenses, typically, such removable lenses include features (e.g., tabs, recesses, notches, and/or the like) to facilitate removal of the lenses, which must necessarily be disposed in the path of light from the light source. Such features may compromise light quality, as well as be aesthetically unpleasing.

SUMMARY

Some embodiments of the present fixtures are configured (e.g., via a mechanical actuator that is configured to direct movement of a light mount relative to a base along an arcuate path defined by one or more bearing surfaces) to allow adjustment of light output from the fixture while minimizing binding, undesirable and/or unintended movements of the light mount relative to the base, and/or the like.

Some embodiments of the present fixtures are configured (e.g., via an interface between a stationary portion of the fixture and a rotatable portion of the fixture that is at least partially defined by one or more smooth surfaces) to provide for a smooth and consistent feel during rotation of the rotatable portion relative to the stationary portion.

Some embodiments of the present mounts are configured (e.g., via a base having a sidewall that defines an outer perimeter and one or more mounting tabs, each movable between a deployed state and a retracted state in which at least a portion of the mounting tab is disposed within the outer perimeter) to allow for installation of the mount into a structure through a relatively small opening (e.g., an opening having a maximum transverse dimension approximately equal to a maximum transverse dimension of the outer perimeter).

Some embodiments of the present removable shroud assemblies are configured (e.g., via a lens coupled to a second end of a shroud, the shroud having a first end defining an aperture, the lens movable from a first position to a second position in which a portion of the lens is not in contact with the second end of the shroud) to allow for the shroud to be removed from a base, mount, and/or fixture via access to the second end of the shroud through the aperture (e.g., without requiring the placement of removal features, such as tabs, recesses, notches, and/or the like in a path of light from the light source).

Some embodiments of the present light fixtures comprise: a base comprising a sidewall extending between a first end and a second end to define an interior passageway, the first end defining an aperture, a light mount movably coupled to the base, and a mechanical actuator configured to direct movement of the light mount relative to the base, the mechanical actuator comprising one or more first sliders coupled to the light mount, a first guide coupled to the base and comprising one or more arcuate bearing surfaces that define an arcuate path along which movement of the light mount relative to the base is permitted, each of the one or more arcuate bearing surfaces configured to support at least one of the one or more first sliders, an input shaft, a carrier member movably coupled to the input shaft, the carrier member longitudinally movable relative to the input shaft, and a lever movably coupled to the carrier member and pivotally coupled to the base, the lever configured to move the one or more first sliders along the one or more arcuate bearing surfaces in response to movement of the carrier member relative to the input shaft, where movement of the one or more first sliders along the one or more arcuate bearing surfaces rotates the light mount relative to the base.

In some embodiments, the one or more arcuate bearing surfaces of the first guide comprises two or more arcuate bearing surfaces, each configured to support at least one of the one or more first sliders. In some embodiments, the first guide is configured to restrict rotational movement of the carrier member relative to the input shaft. In some embodiments, the first guide has a maximum transverse dimension smaller than a maximum transverse dimension defined by the sidewall of the base. In some embodiments, no portion of the first guide extends beyond an outer perimeter defined by the sidewall of the base. In some embodiments, the first guide is pivotally coupled to the base and movable between a first position and a second position in which no portion of the first guide extends beyond an outer perimeter defined by the sidewall of the base.

Some embodiments comprise one or more second sliders coupled to the light mount and a second guide coupled to the base opposite the first guide, the second guide comprising one or more arcuate bearing surfaces, each configured to support at least one of the one or more second sliders. In some embodiments, the one or more arcuate bearing surfaces of the second guide comprises two or more arcuate bearing surfaces, each configured to support at least one of the one or more second sliders. In some embodiments, the second guide has a maximum transverse dimension smaller than a maximum transverse dimension defined by the sidewall of the base. In some embodiments, no portion of the second guide extends beyond an outer perimeter defined by the sidewall of the base.

In some embodiments, the light mount comprises an elongated slot configured to releasably couple a light source to the light mount. In some embodiments, the light mount comprises a retaining spring configured to releasably secure the light source relative to the light mount. In some embodiments, the light mount includes a first support movably coupled to the first guide via the one or more first sliders and a second support movably coupled to the second guide via the one or more second sliders. In some embodiments, the light mount includes a brace extending between the first support and the second support.

In some embodiments, at least a portion of the input shaft is threaded and the carrier member is threadably coupled to the threaded portion of the input shaft such that rotation of the input shaft causes longitudinal movement of the carrier member relative to the input shaft. In some embodiments, at least a portion of the input shaft is accessible through the aperture. Some embodiments comprise an adjustment knob coupled to the input shaft such that rotation of the adjustment knob rotates the input shaft.

In some embodiments, the lever includes a slot configured to movably coupled the lever to the carrier member. In some embodiments, the lever includes a slot configured to movably couple the lever to at least one of the one or more first sliders. Some embodiments comprise a linkage extending between a first end and a second end, where the first end of the linkage is pivotally coupled to at least one of the one or more first sliders.

Some embodiments comprise a tilt indicator including a lever extending between a first end and a second end that defines a slot, where the first end of the lever is pivotally coupled to the base and the second end of the lever is slidably coupled to at least one of the one or more sliders via the slot. In some embodiments, the first end of the lever of the tilt indicator includes a gauge configured to indicate an angular position of the light mount relative to the base.

In some embodiments, the base comprises a stationary portion and a rotatable portion configured to rotate relative to the stationary portion in a plane substantially parallel to a plane defined by the aperture and the light mount is coupled to the rotatable portion of the base. In some embodiments, the base comprises a circular cross-section.

Some embodiments of the present methods for moving a light mount of a light fixture relative to a base of the light fixture comprise: adjusting a position of an input shaft to move the light mount relative to the base along an arcuate path defined by one or more arcuate bearing surfaces of a guide coupled to the base, where the light mount comprises one or more sliders, each supported by one of the one or more arcuate bearing surfaces, and where the input shaft is coupled to the one or more sliders through a lever pivotally coupled to the base.

Some embodiments of the present light fixtures comprise: a stationary portion configured to secure the light fixture to a structure, the stationary portion comprising a body having a sidewall defining an interior volume and a ledge configured to project from the sidewall, and a rotatable portion couplable to a light source and rotatably couplable to the stationary portion, the rotatable portion comprising a body having a first retaining member and a second retaining member configured to be longitudinally spaced from the first retaining member, where the ledge of the stationary portion is configured to be received between the first and second retaining members of the rotatable portion such that an interface between the ledge and the first and second retaining members is at least partially defined by one or more smooth surfaces. In some embodiments, the ledge is unitary with the body of the stationary portion. In some embodiments, at least one of the first and second retaining member is unitary with the body of the rotatable portion.

Some embodiments of the present light fixtures comprise: a stationary portion configured to secure the light fixture to a structure, the stationary portion comprising a body having a sidewall defining an interior volume, a first retaining member configured to project away from the sidewall, and a second retaining member configured to project away from the sidewall such that the second retaining member is longitudinally spaced from the first retaining member, and a rotatable portion couplable to a light source and rotatably couplable to the stationary portion, the rotatable portion comprising a body having a ledge configured to be received between the first and second retaining members of the stationary portion such that an interface between the ledge and the first and second retaining members is at least partially defined by one or more smooth surfaces. In some embodiments, the ledge is unitary with the body of the rotatable portion. In some embodiments, at least one of the first and second retaining members is unitary with the body of the stationary portion.

In some embodiments, a compression applied by the first and second retaining members to the ledge is adjustable, whereby a frictional force that resists rotation of the rotatable portion relative to the stationary portion can be varied. Some embodiments comprise one or more fasteners configured to retain the ledge between the first and second retaining members. In some embodiments, at least one of the one or more fasteners comprises at least one of the first and second retaining members.

Some embodiments comprise one or more low-friction materials disposable between the ledge and at least one of the first and second retaining members such that the one or more low-friction materials define at least a portion of the interface between the ledge and the at least one of the first and second retaining members. In some embodiments, the one or more low-friction materials comprises polytetrafluoroethylene.

In some embodiments, the stationary portion comprises a circular cross-section. In some embodiments, the ledge is annular. In some embodiments, at least one of the first and second retaining members is annular.

In some embodiments, the rotatable portion comprises a light mount configured to be coupled to the light source and the light mount is movable relative to the rotatable portion along an arcuate path.

Some embodiments of the present methods comprise: rotating a rotatable portion of a light fixture relative to a stationary portion of the light fixture, the rotatable portion configured to be coupled to a light source and the stationary portion configured to secure the light fixture to a structure, where a ledge of the stationary portion is received between first and second retaining members of the rotatable portion, and where an interface between the ledge and the first and second retaining members is at least partially defined by one or more smooth surfaces.

Some embodiments of the present methods comprise: rotating a rotatable portion of a light fixture relative to a stationary portion of the light fixture, the rotatable portion configured to be coupled to a light source and the stationary portion configured to secure the light fixture relative to a structure, where a ledge of the rotatable portion is received between first and second retaining members of the stationary portion, and where an interface between the ledge and the first and second retaining members is at least partially defined by one or more smooth surfaces.

In some embodiments, the light fixture comprises one or more low-friction materials disposed between the ledge and at least one of the first and second retaining members, the one or more low-friction materials defining at least a portion of the interface between the ledge and the at least one of the first and second retaining members.

Some embodiments of the present mounts for a light fixture comprise: a base having a sidewall extending between a first end and a second end to define an interior passageway, the first end defining an aperture, where the sidewall defines an outer perimeter, and one or more mounting tabs movably coupled to the base, each mounting tab movable between a deployed state in which at least a portion of the mounting tab extends outwardly from the base and beyond the outer perimeter and a retracted state in which a majority of the mounting tab is disposed within the outer perimeter. In some embodiments, each of the one or more mounting tabs is completely disposed within the outer perimeter when the mounting tab is in the retracted state.

In some embodiments of the present mounts for a light fixture, the one or more mounting tabs are axially movable between the deployed state and the retracted state. In some embodiments, each of the one or more mounting tabs comprises a portion that is disposed within the interior passageway and accessible through the aperture when the mounting tab is in the deployed state. In some embodiments, the one or more mounting tabs are biased towards the retracted state.

In some embodiments of the present mounts for a light fixture, each of the one or more mounting tabs comprises a support that extends from the mounting tab and towards the first end of the base, where the support is configured to rest on an interior surface of a wall, ceiling, or floor when the mount is used to install a light fixture. In some embodiments, each support is removably coupled to one of the one or more mounting tabs.

Some embodiments of the present mounts for a light fixture comprise: one or more retaining posts, each retaining post configured to limit outward movement of one of the one or more mounting tabs beyond the deployed state and inward movement of the mounting tab beyond the retracted state. In some embodiments, the one or more retaining posts are disposed within the outer perimeter. In some embodiments, the one or more retaining posts are disposed within the interior passageway. In some embodiments, each of the one or more retaining posts is configured to selectively and releasably secure one of the one or more mounting tabs relative to the base.

In some embodiments of the present mounts for a light fixture, the mount comprises a circular cross-section. In some embodiments, the first end of the base comprises a lip that extends outwardly from the sidewall and beyond the outer perimeter. In some embodiments, the sidewall defines one or more openings, each opening configured to receive at least a portion of one of the one or more mounting tabs as the mounting tab moves between the deployed state and the retracted state.

Some embodiments of the present mounts for a light fixture comprise: one or more latching mechanisms extending from the sidewall and into the interior passageway, the one or more latching mechanisms configured to releasably secure light fixture components relative to the mount.

Some embodiments of the present methods for installing a light fixture comprise: inserting a base of a mount into an opening in a wall, ceiling, or floor, the base comprising a sidewall extending between a first end and a second end, the sidewall defining an outer perimeter and moving one or more mounting tabs of the mount between a deployed state in which at least a portion of each of the one or more mounting tabs extends outwardly from the base and beyond the outer perimeter and a retracted state in which a majority of each of the one or more mounting tabs is disposed within the outer perimeter.

Some embodiments of the present removable shroud assemblies for a light fixture comprise: a shroud having a sidewall extending between a first end and a second end to define an interior passageway, the first end defining an aperture, and a lens coupled to the second end of the shroud and accessible through the interior passageway, the lens movable from a first position to a second position in which a portion of the lens is not in contact with the second end of the shroud, where the shroud assembly is configured such that the second end of the shroud is accessible through the interior passageway when the lens is in the second position. In some embodiments, the lens is biased towards the first position. Some embodiments comprise one or more springs configured to bias the lens towards the first position. In some embodiments, the shroud comprises a circular cross-section.

Some embodiments of the present removable shroud assemblies for a light fixture comprise: a lens retaining cup configured to locate the lens relative to the shroud when the lens is in the first position. In some embodiments, the lens retaining cup is configured to overlie at least a portion of the sidewall when the lens is in the first position.

In some embodiments of the present removable shroud assemblies for a light fixture, the shroud comprises one or more projections extending from the sidewall and away from the interior passageway, the one or more projections configured to removably couple the shroud assembly to the light fixture. In some embodiments, the light fixture comprises a recessed light fixture.

Some embodiments of the present methods for removing a shroud assembly from a light fixture comprise: accessing a second end of a shroud through an interior passageway of the shroud by moving a lens that is coupled to the second end from a first position to a second position in which a portion of the lens is not in contact with the second end and removing the shroud assembly from the light fixture, where the shroud comprises a sidewall extending between a first end and the second end to define the interior passageway.

As used in this disclosure, and unless stated otherwise, lateral and/or laterally means in a direction that is generally parallel with the plane of an aperture and/or parallel to a face of a structure to and/or within which a light fixture is mounted and/or a direction that is generally perpendicular to a longitudinal direction, and longitudinal and/or longitudinally means in a direction that is generally perpendicular with the plane of an aperture and/or perpendicular to a face of a structure to and/or within which a light fixture is mounted and/or a direction that is generally perpendicular to a lateral direction.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 1D and 1E are right and left side views, respectively, of the embodiment of FIG. 1A, shown with a light mount in a second position relative to a base.

DETAILED DESCRIPTION OF ILLUSTRATIVE EMBODIMENTS

Figure 1A:
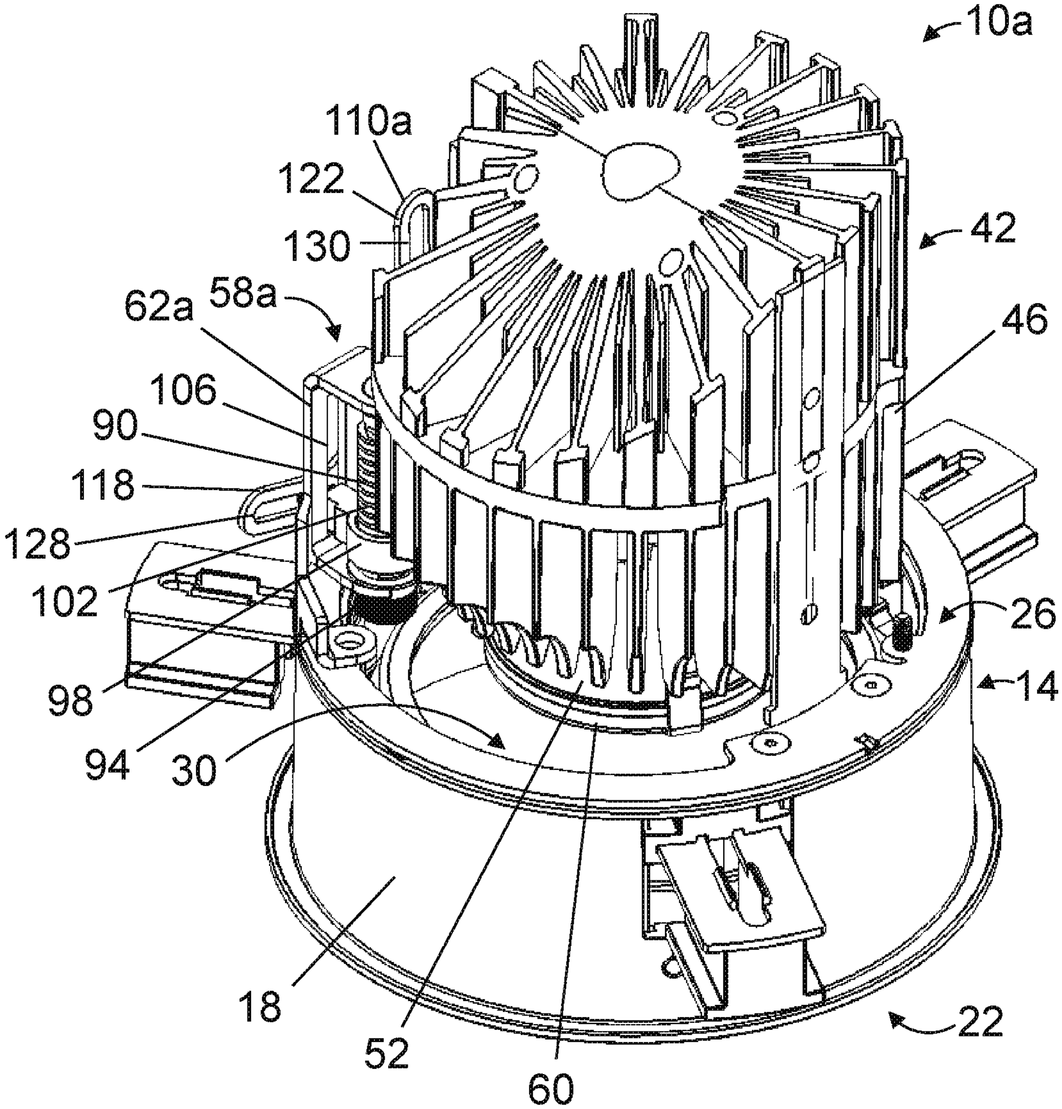
FIG. 1A is a perspective view of a first embodiment of the present light fixtures.
Figure 1B:
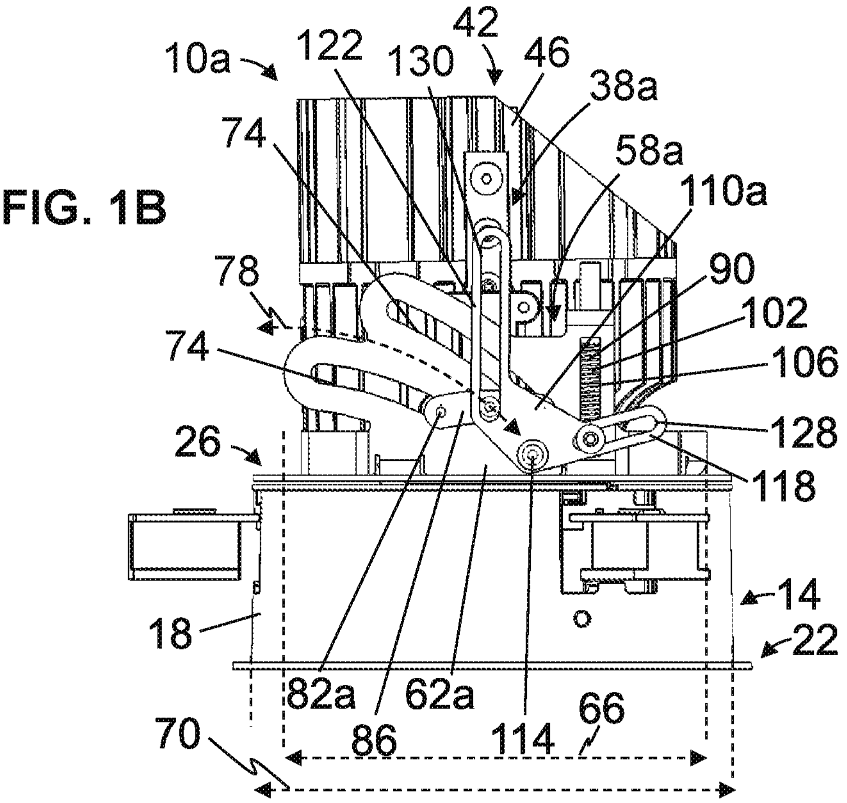
FIGS. 1B and 1C are right and left side views, respectively, of the embodiment of FIG. 1A, shown with a light mount in a first position relative to a base.
Figure 1C:
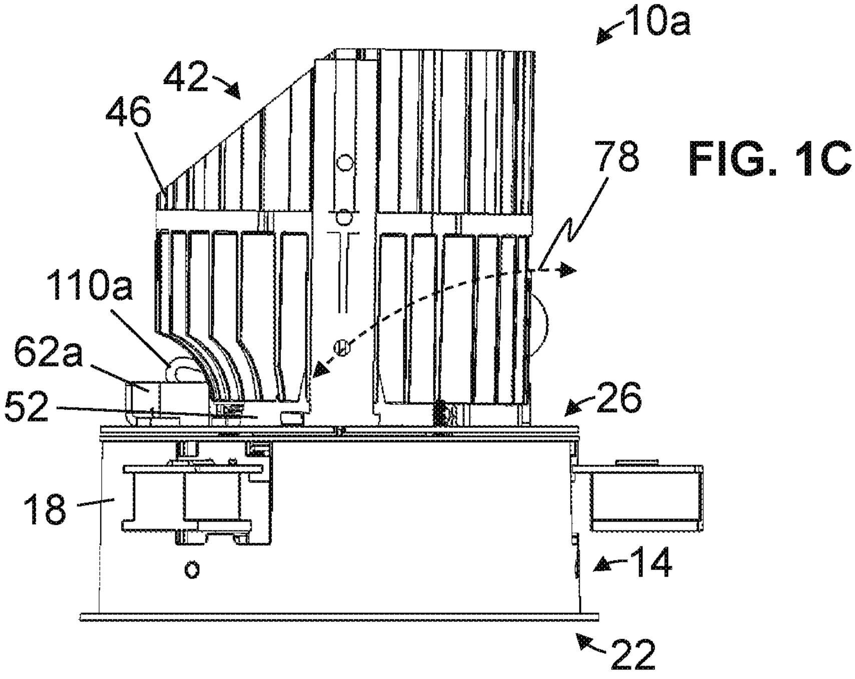
Figure 1G:
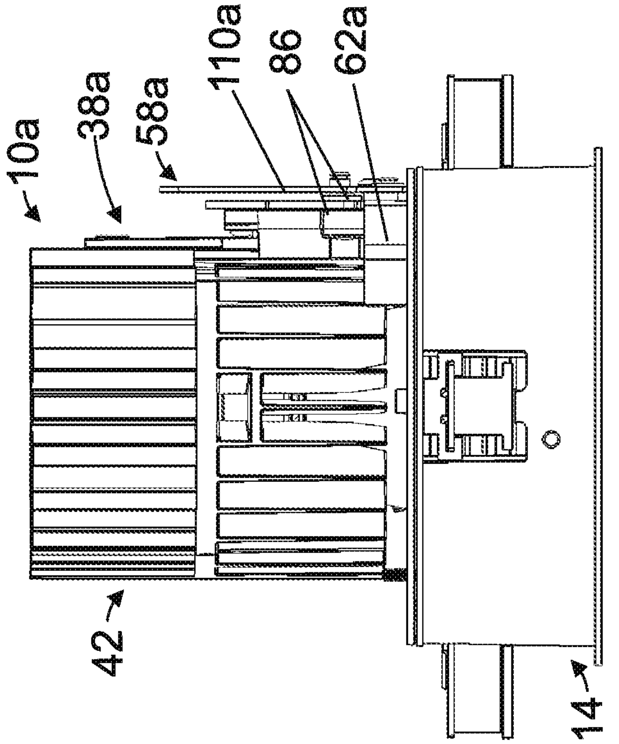
FIGS. 1F and 1G are front and back views, respectively, of the embodiment of FIG. 1A.
Figure 1F:
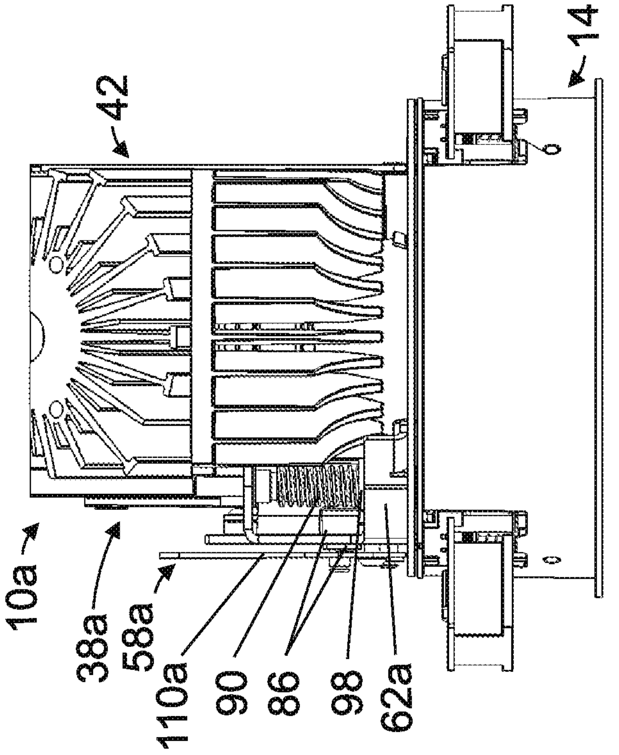
Figure 1I:
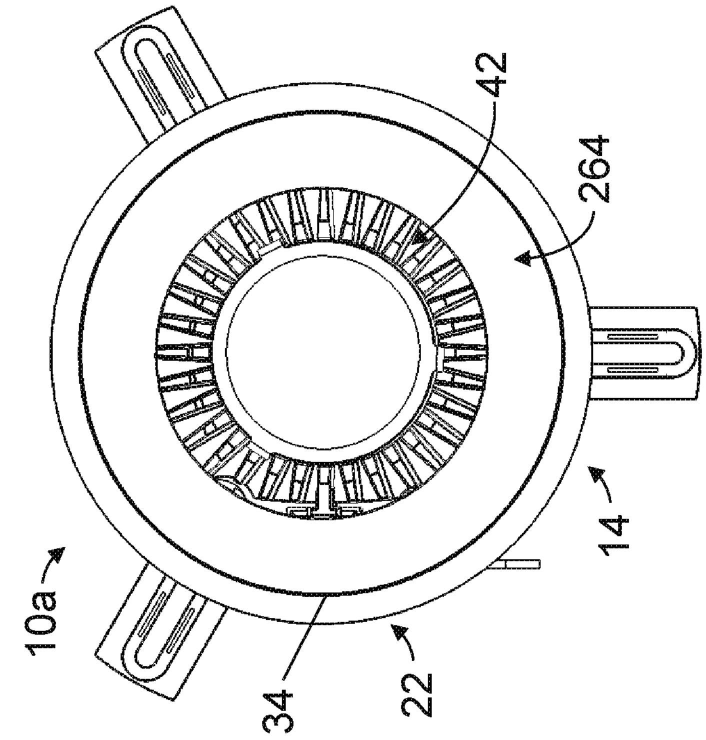
FIGS. 1H and 1I are top and bottom views, respectively, of the embodiment of FIG. 1A.
Figure 1H:
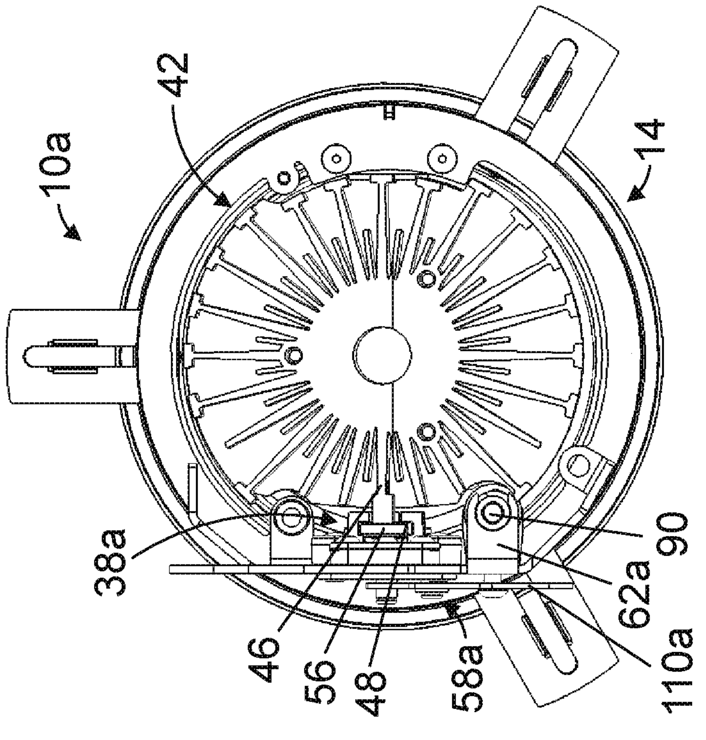
Figure 1J:
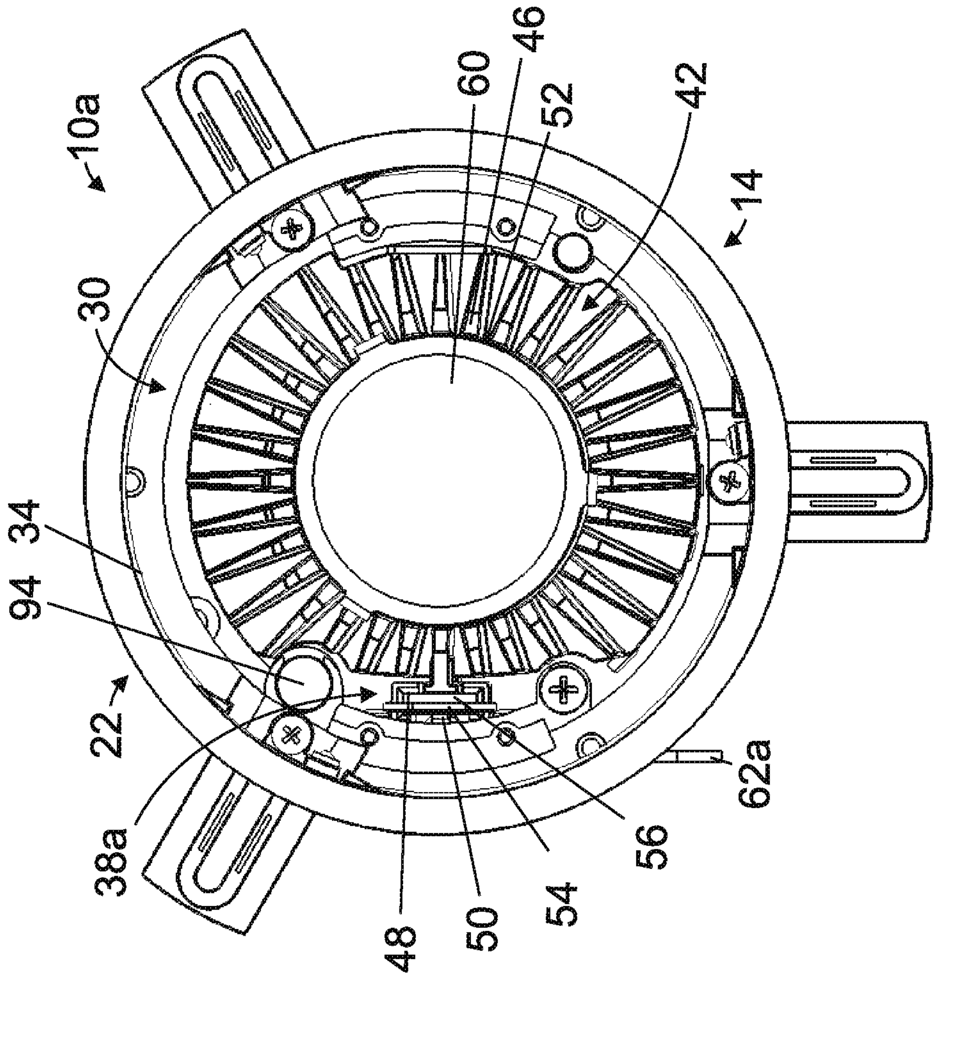
FIG. 1J is a bottom view of the embodiment of FIG. 1A, shown with a shroud assembly removed.
Figure 1K:
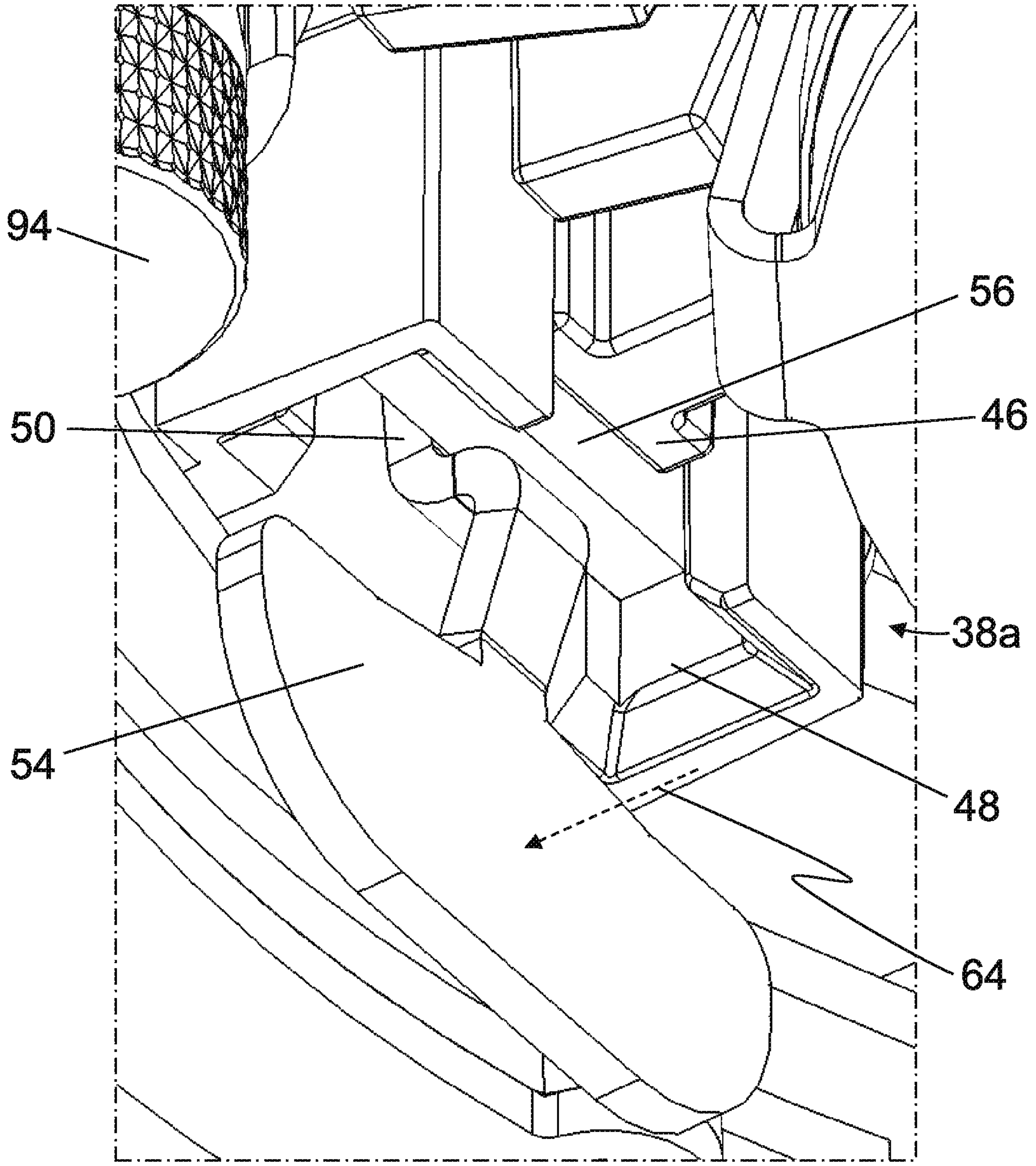
FIG. 1K is a partially cutaway and perspective view of the embodiment of FIG. 1A, shown with a shroud assembly removed.
Figure 1L:
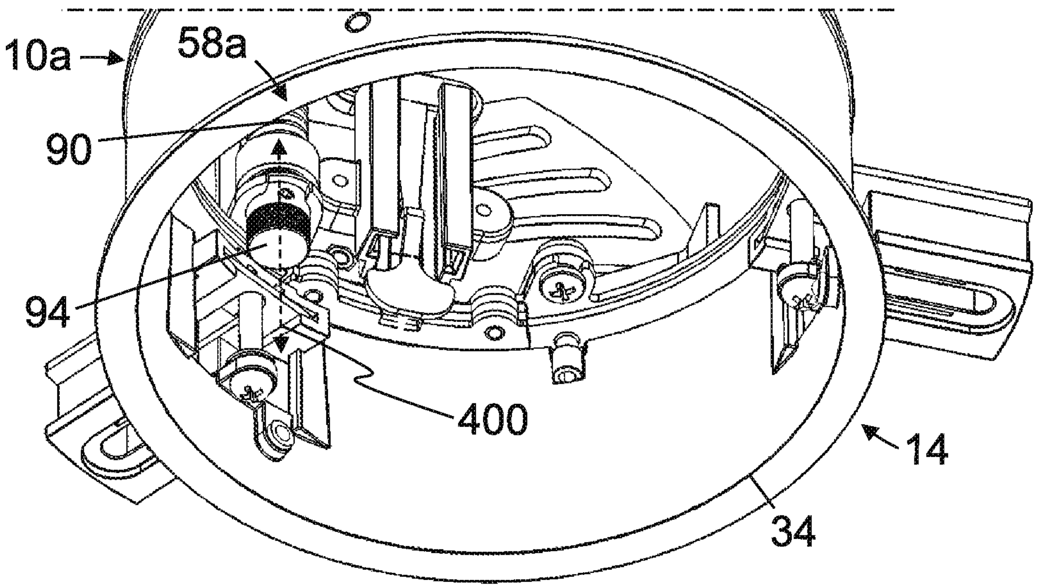
FIG. 1L is a partially cutaway perspective view of the embodiment of FIG. 1A.
Figure 1M:
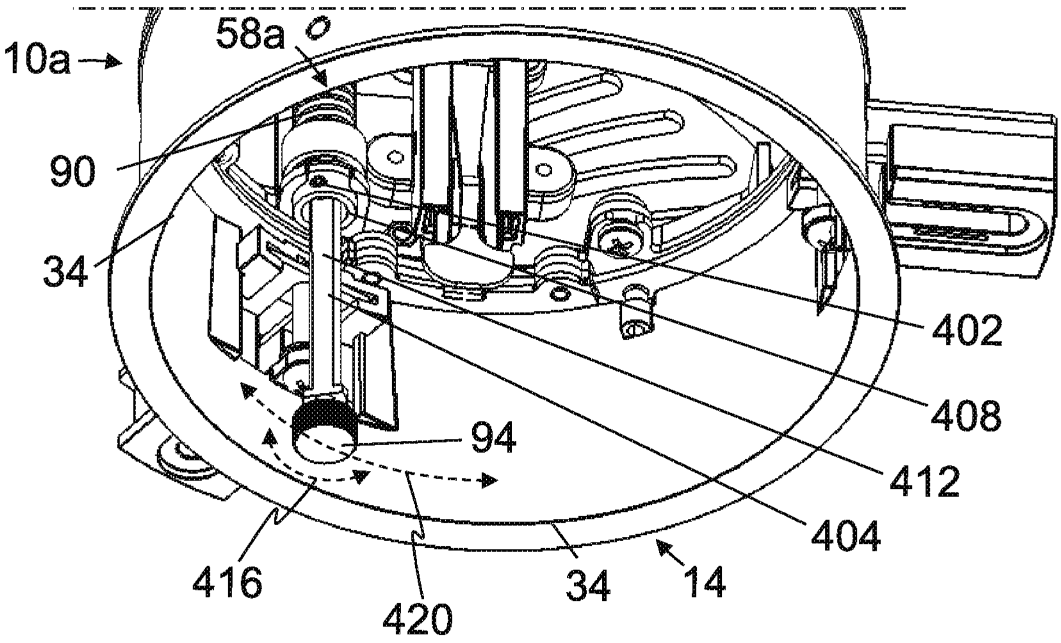
FIG. 1M is a partially cutaway perspective view of the embodiment of FIG. 1A, shown with an adjustment knob in an extended position.
Figure 1N:
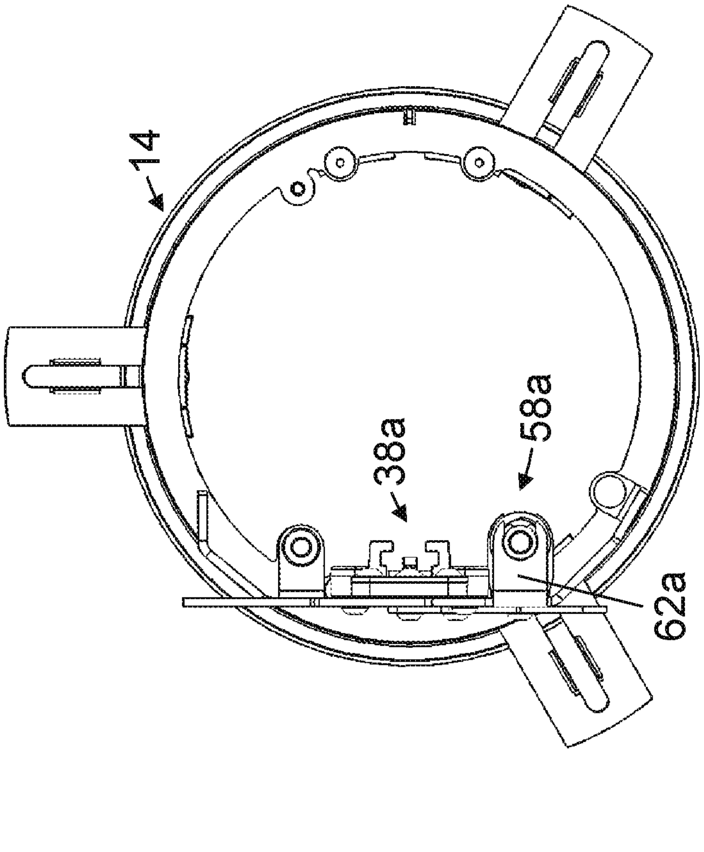
FIG. 1N is a top view of the embodiment of FIG. 1A, shown without a light source and with a guide in a first position relative to a base.
Figure 1O:
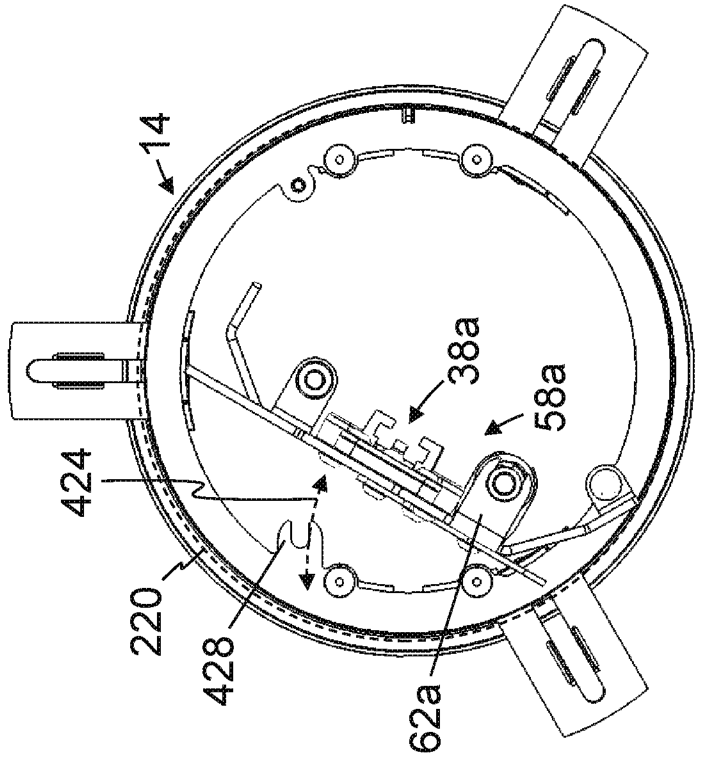
FIG. 1O is a top view of the embodiment of FIG. 1A, shown without a light source and with a guide in a second position relative to a base.

Referring now to the drawings, and more particularly to FIGS. 1A-1O, shown therein and designated by the reference numeral 10*a* is a first embodiment of the present light fixtures. In the embodiment shown, fixture 10*a* comprises a base 14 having a sidewall 18 extending between a first end 22 and a second end 26 to define an interior passageway 30. In this embodiment, first end 22 defines an aperture 34, whereby light may travel from second end 26 to first end 22 through the interior passageway and exit through aperture 34. In the depicted embodiment, base 14 is rounded (e.g., base 14, or a portion thereof, has a circular cross-section); however, in other embodiments, the present fixtures can comprise respective bases with any suitable shape (e.g., having cross-sections that are circular, elliptical, and/or otherwise rounded, triangular, square, rectangular, and/or otherwise polygonal, and/or the like).

In the embodiment shown, fixture 10*a* comprises a light mount 38*a* configured to be coupled to a light source (e.g., 42, described below). The present light fixtures may be used with any suitable light source, whether electroluminescent (e.g., light-emitting diodes), fluorescent (e.g., fluorescent tubes), incandescent (e.g., incandescent light bulbs), and/or the like, and light source 42 is provided only by way of illustration. For example, in this embodiment, light source 42 includes a light-emitted diode (LED) light source, with a heat sink 46, a reflector 52, and a lens 60. In the depicted embodiment (FIG. 1J), light source 42 is sized and/or shaped so as to be capable of passing through interior passageway 30 of base 14, such that, for example, light source 42 may be installed into and/or removed from fixture 10*a* through aperture 34 (e.g., facilitating installation, replacement, and/or the like of light source 42 when fixture 10*a* is installed in a structure).

In the embodiment shown, light mount 38*a* comprises an elongated slot 48 (FIGS. 1H-1K) configured to releasably secure a light source (e.g., 42) relative to the light mount. In this embodiment, elongated slot 48 extends through light mount 38*a* and is sized to slidably receive a portion of light source 42 (e.g., a portion of heat sink 46, and/or a coupling member 56 coupled to light source 42, as shown) such that light source 42 may be releasably secured relative to light mount 38*a* and/or elongated slot 48 by way of a retaining spring 50 (FIG. 1K). In the depicted embodiment, retaining spring 50 comprises a flat spring and is biased towards a locked position in which the retaining spring physically obstructs passage of light source 42 (e.g., coupling member 56 coupled to heat sink 46) out of light mount 38*a* (e.g., elongated slot 48) when the light source is coupled to the light mount. In the depicted embodiment, retaining spring 50 may be moved to an unlocked position via application of a lateral force (e.g., generally in a direction indicated by arrow 64) to tab 54, thereby allowing light source 42 to be removed from and/or installed into light mount 38*a* (e.g., from first end 22). In the embodiment shown (FIGS. 1J and 1K), tab 54 is accessible through aperture 34 (e.g., to allow a user to remove and/or install light source 42 from and/or into light mount 38*a* when fixture 10*a* is installed in a structure). In other embodiments, a light source can be coupled to a respective light mount in any suitable fashion, such as, for example, by integral formation, fasteners, and/or the like.

In the embodiment shown, light mount 38*a* is movably coupled to base 14 such the light mount (and light source 42, when coupled to the light mount) may rotate and/or translate relative to the base (e.g., fixture 10*a* comprises an adjustable light fixture). For example, in this embodiment, and as described in more detail below, mechanical actuator 58*a* generally functions to move light mount 38*a* relative to base 14 along an (e.g., planar) arcuate path 78 (e.g., compare FIGS. 1B and 1C with FIGS. 1D and 1E).

In the embodiment shown, mechanical actuator 58*a* comprises a guide 62*a* coupled to base 14. In this embodiment, guide 62*a* is coupled to the base (e.g., a rotatable portion 142 thereof, described in more detail below) via one or more fasteners; however, in other embodiments, respective guides may be unitary with respective bases (e.g., or respective portions thereof). In the depicted embodiment, as shown in FIG. 1B, guide 62*a* has a maximum transverse dimension 66 smaller than a maximum transverse dimension 70 defined by sidewall 18 of base 14 (e.g., to facilitate installation of fixture 10*a* into a structure by minimizing interferences between the structure and guide 62*a*). In the embodiment shown, guide 62*a*comprises one or more arcuate bearing surfaces 74 (e.g., defined by slots, in this embodiment), which define an arcuate path (e.g., generally indicated as 78) along which movement of light mount 38*a* relative to base 14 is permitted (e.g., between a first position, as shown in FIGS. 1B and 1C, and a second position, as shown in FIGS. 1D and 1E, in which light mount 38*a* is angularly (and translationally) displaced relative to base 14). Embodiments of the present fixtures can comprise any suitable number of arcuate bearing surfaces, such as, for example 1, 2, 3, 4, or more arcuate bearing surfaces.

In this embodiment, each of one or more arcuate bearing surfaces 74 is configured to support one or more sliders 82*a* (e.g., pins, dowels, and/or the like), which in this embodiment, are coupled to light mount 38*a* such that the one or more sliders, supported by the one or more arcuate bearing surfaces, carry the light mount relative to base 14. In this way, one or more sliders 82*a* may slide along one or more arcuate bearing surfaces 74, thus causing light mount 38*a* to move (e.g., rotate and translate) relative to base 14 along arcuate path 78. In the depicted embodiment, movement of the one or more sliders laterally away from the one or more arcuate bearing surfaces may be limited by one or more retaining members 86, which may be coupled to the one or more sliders 82*a* on either side of guide 62*a* (e.g., such that the guide is disposed between two or more retaining members).

In the embodiment shown, at least by including at least two arcuate bearing surfaces 74, each of which supports at least one slider 82*a*, translational motion and rotational motion of light mount 38*a* relative to base 14 may be coupled along the arcuate path. In other words, in this embodiment, at given translational position of the light mount relative to the base, mechanical actuator 58*a*, and more particularly guide 62*a*, may dictate a corresponding rotational position of the light mount relative to the base. For example, in the depicted embodiment, as light mount 38*a* moves relative to base 14 along arcuate path 78, the light mount may tend to rotate in a first direction as a distance between the arcuate bearing surfaces increases, and the light mount may tend to rotate in a second direction, opposite the first direction, as a distance between the arcuate bearing surfaces decreases. Thus, the present fixtures, and more particularly, respective mechanical actuators of the present fixtures, may be configured to reduce the occurrence of binding and/or undesirable movements of a light mount and/or light source (e.g., rolling, yawing, undesired lateral translation, and/or the like) which might otherwise occur during adjustment.

Control of light mount 38*a* movement relative to base 14 along arcuate path 78 can be accomplished in any suitable fashion. Provided by way of illustration, in the embodiment shown, mechanical actuator 58*a* comprises an input shaft 90 configured to control movement of (e.g., and/or to allow a user to adjust the orientation of) the light mount relative to the base along the arcuate path. In this embodiment, as described in more detail below, such control is achieved via rotation of input shaft 90 relative to base 14; however, in other embodiments, such control may be achieved via translation (lateral and/or longitudinal) of input shaft 90 relative to base 14. In the depicted embodiment, mechanical actuator 58*a* comprises an adjustment knob 94 coupled (directly or indirectly) to input shaft 90 such that rotation of the adjustment knob rotates the input shaft. In the embodiment shown, at least a portion of input shaft 90 and/or adjustment knob 94 is accessible through aperture 34 (e.g., to facilitate adjustments to light mount 38*a* position relative to base 14 when fixture 10*a* is installed).

Referring additionally to FIGS. 1L and 1M, in this embodiment, adjustment knob 94 is movably coupled to input shaft 90 and movable from a retracted state (FIG. 1L) to an extended state (FIG. 1M) (e.g., longitudinally, generally along a direction indicated by arrow 400). In the depicted embodiment, a user may apply a longitudinal force to move adjustment knob 94 relative to input shaft 90 between the retracted state and the deployed state, where the applied longitudinal force may be sufficient to overcome a force (e.g., supplied via releasable fasteners, a frictional fit, interlocking features, and/or the like, such as, for example, ball plunger 402) that retains the adjustment knob relative to the input shaft. For example, in the embodiment shown, adjustment knob 94 is coupled to input shaft 90 via a shaft 404, which may be slidably received within an interior channel 408 defined by the input shaft. In this embodiment, adjustment knob 94, via shaft 404, may be rotatably engaged with input shaft 90 whether or not the adjustment knob is in the extended state. For example, in the depicted embodiment, a portion 412 of shaft 404 comprises a non-circular cross-section, which may correspond to a non-circular cross-section defined by interior channel 408 of input shaft 90 (e.g., to define a slidable, yet rotatably engaged, coupling), thus facilitating rotatable engagement of the adjustment knob and the input shaft, regardless of movement of the adjustment knob relative to the input shaft between the retracted and extended states.

As described in more detail below, mechanical actuator 58*a*, and more particularly, input shaft 90, may be coupled to a rotatable portion of fixture 10*a* (e.g., rotatable portion 142 of base 14). In this way, adjustment knob 94 and/or input shaft 90 may be configured to allow a user to adjust a tilt of light mount 38*a* and/or light source 42 relative to base 14 (e.g., along arcuate path 78), by rotating the adjustment knob and/or input shaft about a longitudinal axis of the adjustment knob and/or input shaft (e.g., generally along a direction indicated by arrow 416), and/or adjust a swivel of light mount 38*a* and/or light source 42 (e.g., generally along a direction indicated by arrow 146, shown in FIG. 3A) by translating adjustment knob 94 in a lateral direction relative to base 14 or a portion thereof (e.g., stationary portion 138) (e.g., generally along a direction indicated by arrow 420). In some embodiments, movement of the adjustment knob out of the extended state (e.g., and to the retracted state) may releasably secure an orientation of a rotatable portion (e.g., 142) of base 14 relative to a stationary portion (e.g., 138) of the base (e.g., by engaging the rotatable portion, thus securing the rotatable portion relative to the stationary portion).

In this embodiment, mechanical actuator 58*a* comprises a carrier member 98 movably coupled to input shaft 90 such that the carrier member is longitudinally movable relative to the input shaft. For example, in the depicted embodiment, carrier member 98 is threadably coupled to a threaded portion 102 of input shaft 90 such that rotation of the input shaft and/or adjustment knob 94 causes the carrier member to longitudinally displace relative to the input shaft. In at least this way, the present fixtures, and more particularly, respective mechanical actuators of the present fixtures, may be configured mitigate inadvertent movement of a light mount and/or light source relative to a base (e.g., the present fixtures may be less prone to falling out of adjustment, as the rotatable and threaded coupling between carrier member 98 and input shaft 90 may be resistant to movement when longitudinally acted upon by the weight of light mount 38*a* and/or light source 42 as supported in a given orientation). In the depicted embodiment, guide 62*a* is configured to restrict rotational movement of carrier member 98 relative to input shaft 90, for example, via slot 106, which may receive a portion of the carrier member (e.g., to prevent the carrier member from rotating with the input shaft as the input shaft is rotated).

In the embodiment shown, mechanical actuator 58*a* comprises a lever 110*a* pivotally coupled to base 14 (e.g., to guide 62*a*, as shown, at a pivot point 114). In this embodiment, lever 110*a* is configured to move one or more sliders 82*a* along one or more arcuate bearing surfaces 74 in response to movement of carrier member 98 relative to input shaft 90. For example, in the embodiment shown, lever 110*a* comprises a first portion 118 coupled to carrier member 98, and a second portion 122 coupled to one or more sliders 82*a*, where the first and second portions are disposed on opposing sides of pivot point 114. In this way, movement of first portion 118 in response to movement of carrier member 98 may cause movement of second portion 122, thus causing one or more sliders 82*a* to move along one or more arcuate bearing surfaces 74.

In the embodiment shown, lever 110*a* comprises a slot 128 configured to movably couple the lever to carrier member 98. Similarly, in this embodiment, lever 110*a* comprises a slot 130 configured to movably couple the lever to at least one of one or more sliders 82*a*. In these and other ways, lever 110*a* may be a unitary piece and/or be pivotally coupled to base 14 at a single pivot point 114, while still being capable of controlling movement of light mount 38*a* relative to base 14 along arcuate path 78 (e.g., while being resistant to binding). However, in other embodiments, such movable coupling of a light mount relative to a respective base may be accomplished in any suitable fashion, and the description of fixture 10*a*, and more particularly, mechanical actuator 58*a*, is provided only by way of illustration.

Referring additionally to FIGS. 1N and 1O, in the embodiment shown, guide 62*a* is pivotally coupled to base 14 and movable (e.g., in a lateral plane) between a first position (FIG. 1N) and a second position (FIG. 1O) (e.g., generally along a direction indicated by arrow 424) in which no portion of the guide (and/or mechanical actuator 58*a* and/or light mount 38*a*) extends beyond an outer perimeter 220 defined by sidewall 18 of base 14. In this embodiment, guide 62*a* may be releasably secured relative to base 14 in the first position by way of a latch 428; however, in other embodiments, such releasable securing can be accomplished in any suitable fashion (e.g., fasteners, other interlocking features, and/or the like). In this way, for example, during installation, guide 62*a* (and/or mechanical actuator 58*a* and/or light mount 38*a*) may be moved to the second position (FIG. 1O) (e.g., without a light source 42 coupled to the light mount), fixture 10*a* or a portion thereof (e.g., base 14) may be inserted into an opening of a structure, the guide (e.g., and/or mechanical actuator and/or light mount) may be moved to the first position (FIG. 1N) (e.g., once the guide, mechanical actuator, and/or light mount have passed through the opening in the structure), and the light source may be received by the light mount (e.g., through aperture 34) (e.g., allowing the fixture to be installed into a relatively small opening in a structure, for example, having a shape and dimensions substantially corresponding to a shape and dimensions of outer perimeter 220). While such pivotal coupling is described with respect to mechanical actuator 58*a*, and more particularly, guide 62*a*, other components of a fixture (e.g., drivers, motors, electronics, other adjustment mechanisms, and/or the like) may be configured in a same or substantially similar way (e.g., pivotally coupled to base 14 and movable between a first position and a second position in which no portion of the component extends beyond outer perimeter 220 defined by sidewall 18), to achieve the same or similar functionality (e.g., an opening in a structure is not required to be sized to accommodate the component in the first position).

Referring now to FIGS. 2A-2H, shown therein and designated by the reference numeral 10*b* is a second embodiment of the present light fixtures, shown without a light source (e.g., 42) for clarity. Fixture 10*b* may be substantially similar to fixture 10*a*, with the primary exceptions described below. In the embodiment shown, light mount 38*b* includes a first support 116*a* and a second support 116*b*, each movably coupled to base 14 (e.g., via a first guide 62*b* and a second guide 62*c*, respectively, each described in more detail below). In this embodiment, light mount 38*b* includes a brace 120 coupled to and extending between first support 116*a* and second support 116*b*. In the depicted embodiment, light mount 38*b* includes one or more mounting tabs 124, each coupled to and extending from one of first support 116*a* and second support 116*b*, and each configured to be coupled to a light source (e.g., 42) (e.g., via one or more fasteners, which may be disposed through one or more openings defined by the mounting tab). In these ways and others, light mount 38*b* may support a light source (e.g., 42) relative to base 14 from opposite sides of interior passageway 30, thereby mitigating the occurrence of binding and/or undesirable movements of the light mount and/or light source during movement of the light mount and/or light source relative to the base along arcuate path 78.

In the embodiment shown, fixture 10*b* includes one or more first sliders 82*b* coupled to light mount 38*b*, and more particularly, to first support 116*a* of the light mount. In this embodiment, fixture 10*b* includes a first guide 62*b* coupled to base 14 and defining one or more arcuate bearing surfaces 74, each configured to support at least one of one or more first sliders 82*b*. First guide 62*b* may be substantially similar to guide 62*a*, with the primary exception that first guide 62*b* is not pivotally coupled to base 14 (e.g., to rotatable portion 142 thereof). In the depicted embodiment, no portion of first guide 62*b* extends beyond an outer perimeter 220 defined by sidewall 18 of base 14.

In the embodiment shown, fixture 10*b* includes one or more second sliders 82*c* coupled to light mount 38*b*, and more particularly, to second support 116*b* of the light mount. In this embodiment, at least one of first slider(s) 82*b* and/or second slider(s) 82*c* comprises a fastener, which may have a threaded portion configured to be received by light mount 38*b* and/or a head configured to prevent lateral movement of the slider away from a respective arcuate bearing surface 74 (e.g., the head of the fastener may function as and/or comprise a retaining member 86). In the depicted embodiment, fixture 10*b* includes a second guide 62*c* coupled to base 14 (e.g., to rotatable portion 142 thereof) opposite first guide 62*b* and defining one or more arcuate bearing surfaces 74 (e.g., two arcuate bearing surfaces, as shown), each configured to support at least one of one or more second sliders 82*c*. In this embodiment, second guide 62*c* has a maximum transverse dimension 132 that is smaller than a maximum transverse dimension 70 of base 14. More particularly, in the depicted embodiment, no portion of second guide 62*c* extends beyond an outer perimeter 220 defined by sidewall 18 of base 14. In these ways and others, first guide 62*b* and second guide 62*c* may cooperate to guide movement of light mount 38*b* relative to base 14 along arcuate path 78, thereby mitigating the occurrence of binding and/or undesirable movements of the light mount and/or a light source (e.g., 42) coupled to the light mount.

In the embodiment shown, mechanical actuator 58*b*, similarly to mechanical actuator 58*a*, comprises a lever 110*b* pivotally coupled to base 14 and configured to move one or more first sliders 82*b* along one or more arcuate bearing surfaces 74 of first guide 62*b* in response to movement of carrier member 98 relative to input shaft 90. In this embodiment, lever 110*b* is coupled to at least one of one or more first sliders 82*b* via a linkage 134 (e.g., as opposed to slot 130). More particularly, in the depicted embodiment, linkage 134 extends between a first end that is pivotally coupled to lever 110*b* and a second end that is pivotally coupled to at least one of one or more sliders 82*b*.

In the embodiment shown, fixture 10*b* includes a tilt indicator 136 configured to indicate an angular position of light mount 38*b* (e.g., and thus a light source 42 coupled to the light mount) relative to base 14. For example, in this embodiment, tilt indicator 136 includes a lever 144 extending between a first end that is pivotally coupled to base 14 and a second end that is coupled to light mount 38*b*. More particularly, in the depicted embodiment, the second end of the lever defines a slot 148 configured to slidably engage at least one of second slider(s) 82*c*. Thus, in the embodiment shown, as light mount 38*b* moves relative to base 14 along arcuate path 78, lever 144, due to slidable engagement with at least one of second slider(s) 82*c*, may pivot at its first end relative to base 14. In this embodiment, the first end of the lever includes a gauge 160 including markings (e.g., raised, relieved, and/or printed markings) that are each indicative of an angular position of light mount 38*b* relative to base 14. In the depicted embodiment, tilt indicator 136 includes an indicator or pointer 164, which may be fixed relative to base 14 (e.g., a rotatable portion 142 thereof), configured to cooperate with gauge 160 to indicate an angular position of light mount 38*b* relative to base 14 (e.g., by identifying a marking of gauge 160 that corresponds to the angular position of the light mount relative to the base).

Some embodiments of the present methods for moving a light mount (e.g., 38*a*, 38*b*, and/or the like) of a light fixture (e.g., 10*a*, 10*b*, and/or the like) comprise adjusting a position of an input shaft (e.g., 90) to move the light mount relative to the base along an arcuate path (e.g., 78) defined by one or more arcuate bearing surfaces (e.g., 74) of a guide (e.g., 62*a*, 62*b*, 62*c*, and/or the like) coupled to the base, where the light mount comprises one or more sliders (e.g., 82*a*, 82*b*, 82*c*, and/or the like), each supported by one of the one or more arcuate bearing surfaces, and where the input shaft is coupled to the one or more sliders through a lever (e.g., 110*a*, 110*b*, and/or the like) pivotally coupled to the base.

Figure 3A:
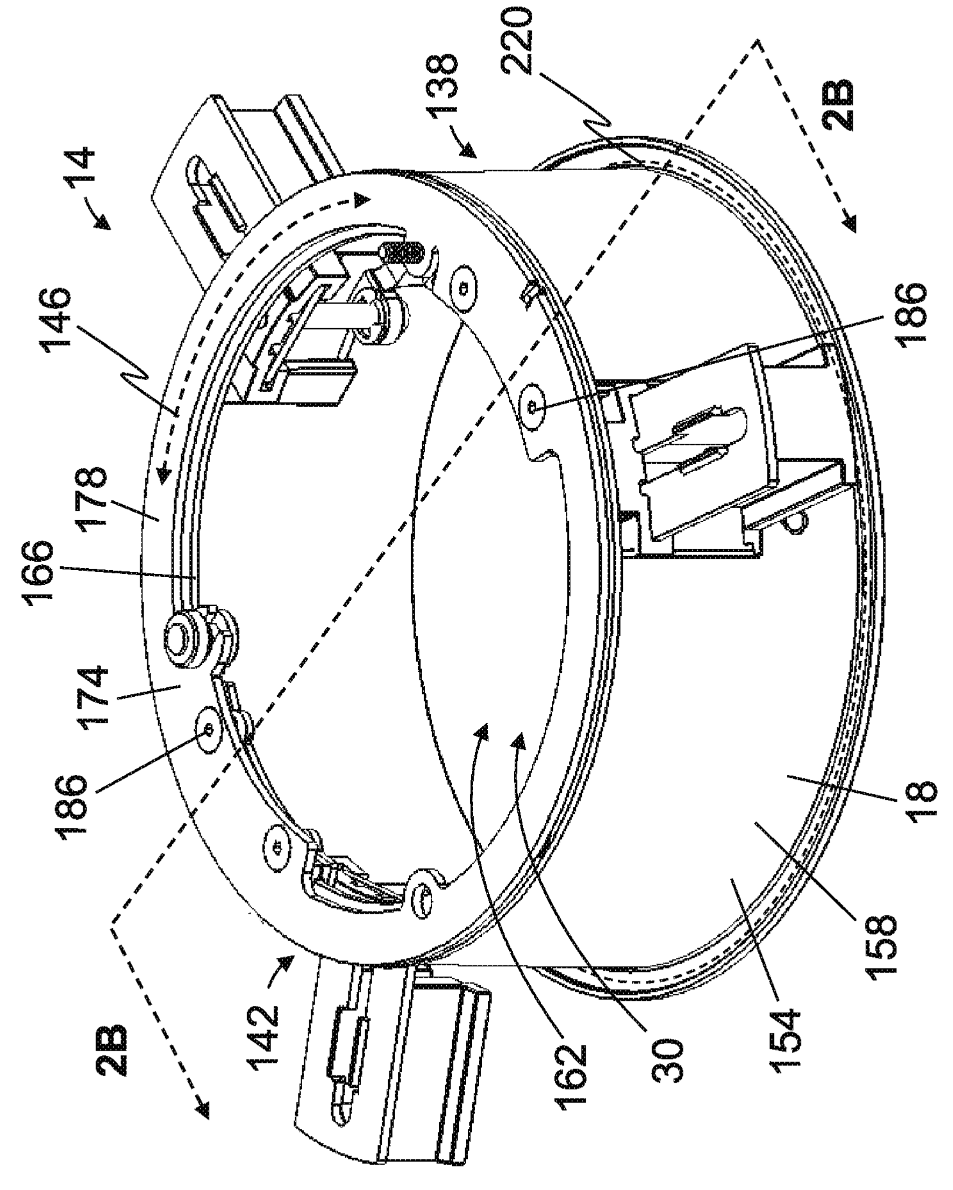
FIG. 3A is a perspective view of a first embodiment of the present bases.
Figure 3B:
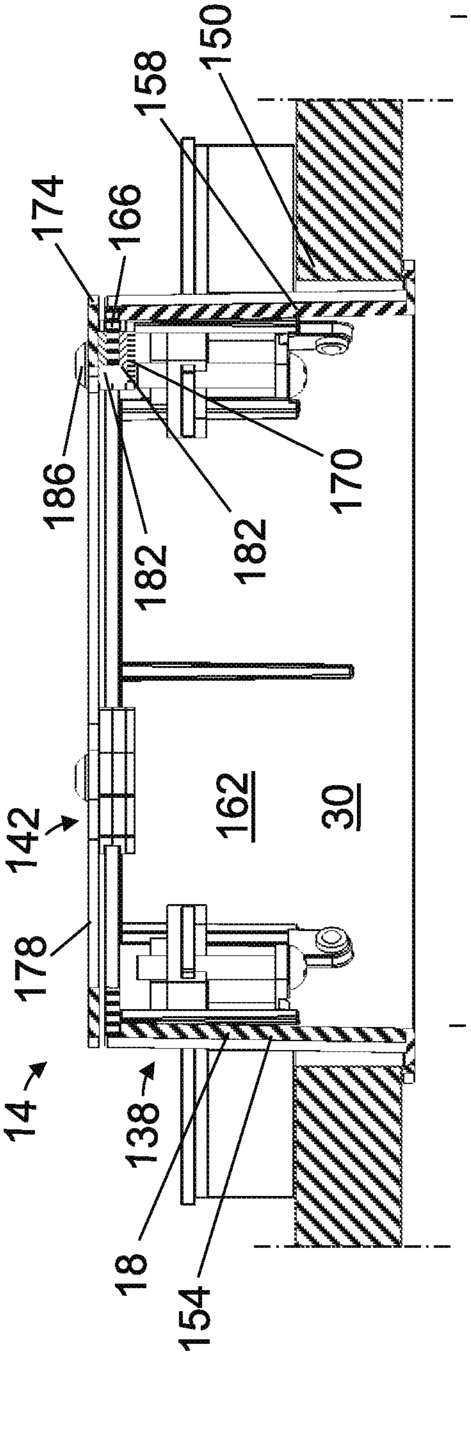
FIG. 3B is a partially cutaway and cross-sectional side view of the embodiment of FIG. 3A.

Referring additionally to FIGS. 3A and 3B, shown therein and designated by the reference numeral 14 is a first embodiment of the present bases. While, in the present disclosure, base 14 is sometimes described as a component of and/or with reference to fixture 10*a* (e.g., FIGS. 1A-1O) (e.g., with some components of base 14 introduced and described above), the present bases can be a component of and/or used with any suitable fixture. In the embodiment shown, base 14 comprises a stationary portion 138 and a rotatable portion 142 configured to rotate relative to the stationary portion (e.g., in a plane substantially parallel to a plane defined by aperture 34, such as a lateral plane, and generally along a direction indicated by arrow 146). In this embodiment, stationary portion 138 is "stationary" in that the stationary portion is configured to secure base 14 (and thus light fixture 10*a*) to and/or at least partially within a structure 150 (e.g., a wall, ceiling, floor, other structure, and/or the like), for example, via one or more mounting tabs 228, described in more detail below. In this embodiment, rotatable portion 142 of base 14 is configured to be coupled to a light source (e.g., 42). For example, in the depicted embodiment, light source 42 is coupled to rotatable portion 142 via one or more fasteners coupling mechanical actuator 58*a*, and more particularly, guide 62*a*, which supports light mount 38*a* and light source 42, to the rotatable portion.

Figure 5A:
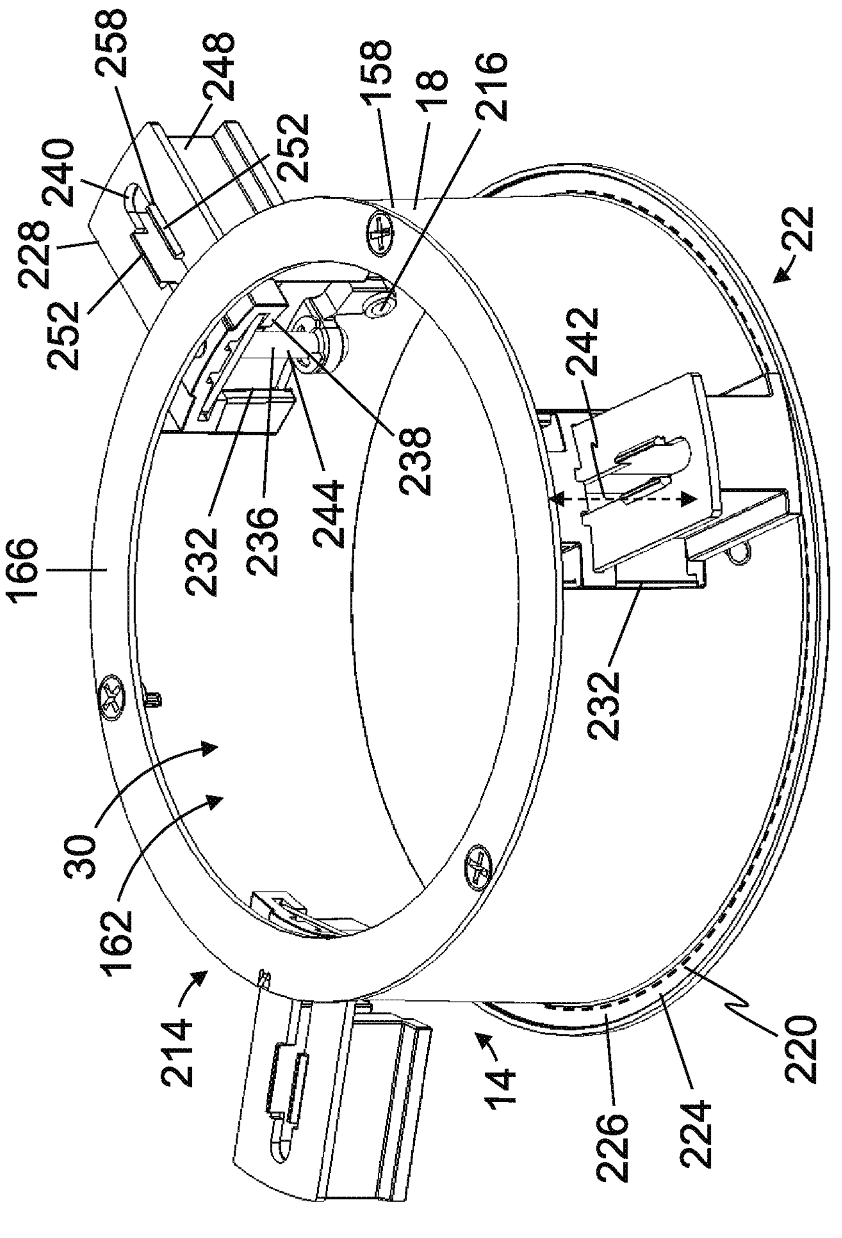
FIG. 5A is a perspective view of one embodiment of the present mounts.
Figure 5C:
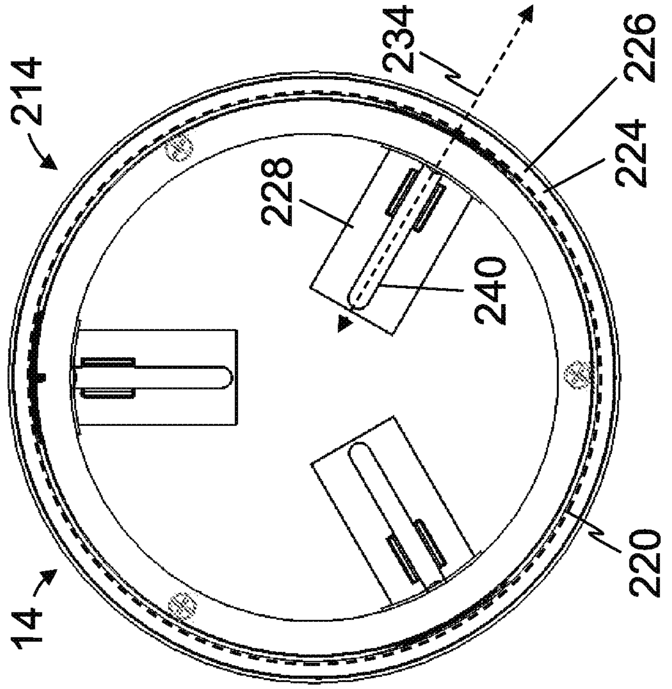
FIG. 5C is a top view of the embodiment of FIG. 5A, shown with mounting tabs in a retracted state.
Figure 5B:
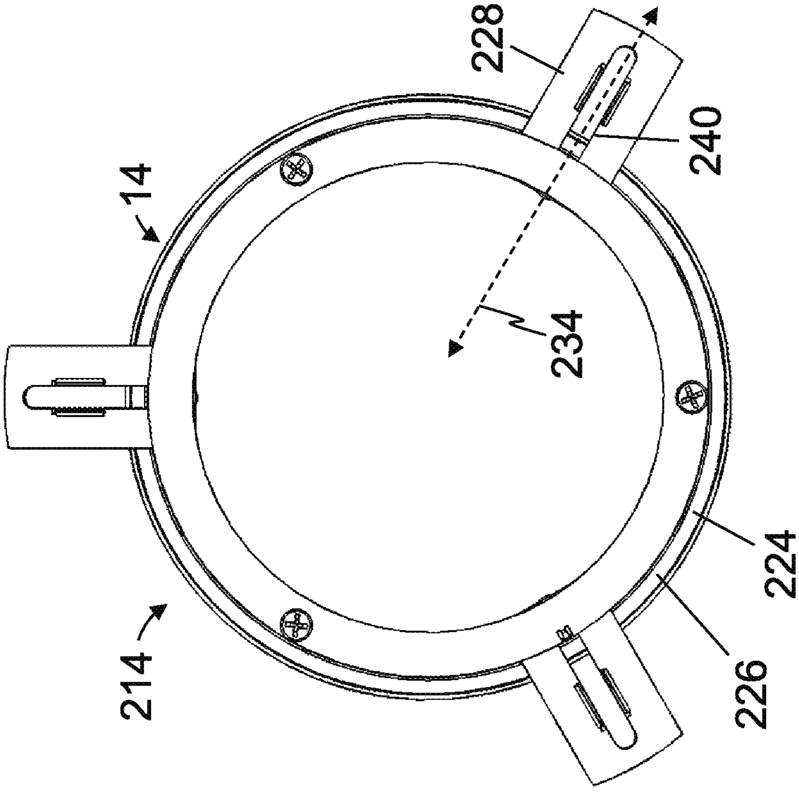
FIG. 5B is a top view of the embodiment of FIG. 5A, shown with mounting tabs in a deployed state.
Figure 5D:
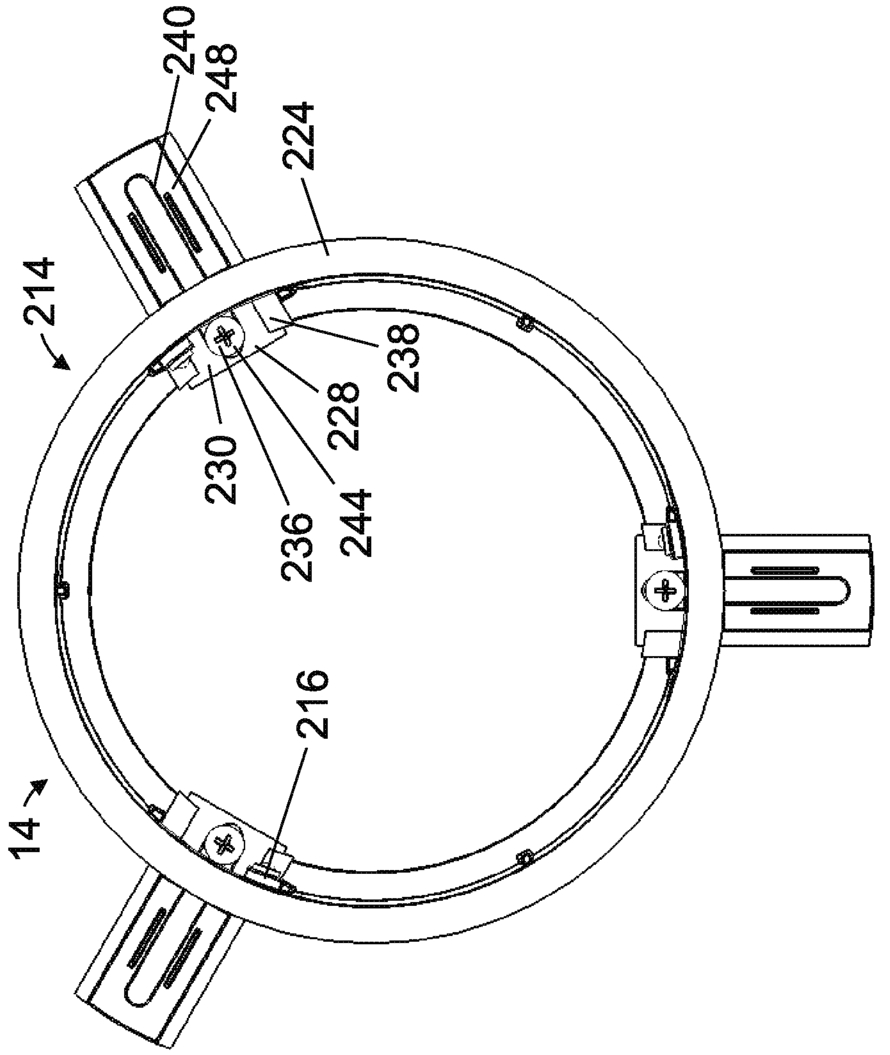
FIG. 5D is a bottom view of the embodiment of FIG. 5A

In the embodiment shown, stationary portion 138 comprises a body 154 having a sidewall 158, which, in some embodiments, may not comprise sidewall 18, defining an interior volume 162, which, in some embodiments, may not coincide with interior passageway 30. For example, in some embodiments, the present bases may comprise a respective sidewall 18 and a respective sidewall 158, which may be (e.g., laterally) offset from sidewall 18, to define an interior volume 162 between sidewall 18 and sidewall 158 (e.g., a sidewall 158 may at least partially separate interior volume 162 and interior passageway 30). In the depicted embodiment, stationary portion 138 comprises a ledge 166 projecting from sidewall 158 and, though not required, into interior volume 162. As shown, ledge 166 is coupled to stationary portion 138, and more particularly, body 154, via one or more fasteners (FIG. 5A); however, in other embodiments, respective ledges may be integrally formed with respective stationary portions and/or respective bodies thereof. In this embodiment, stationary portion 138, and more particularly, body 154, or a portion thereof, comprises a circular cross-section. Thus, in the depicted embodiment, ledge 166 is annular or comprises an annular segment (e.g., ledge 166 may or may not circumscribe interior volume 162). However, in other embodiments, the present bases can comprise respective stationary portions, or respective bodies thereof, with any suitable shape (e.g., having cross-sections that are circular, elliptical, and/or otherwise rounded, triangular, square, rectangular, and/or otherwise polygonal, and/or the like).

Figure 2A:
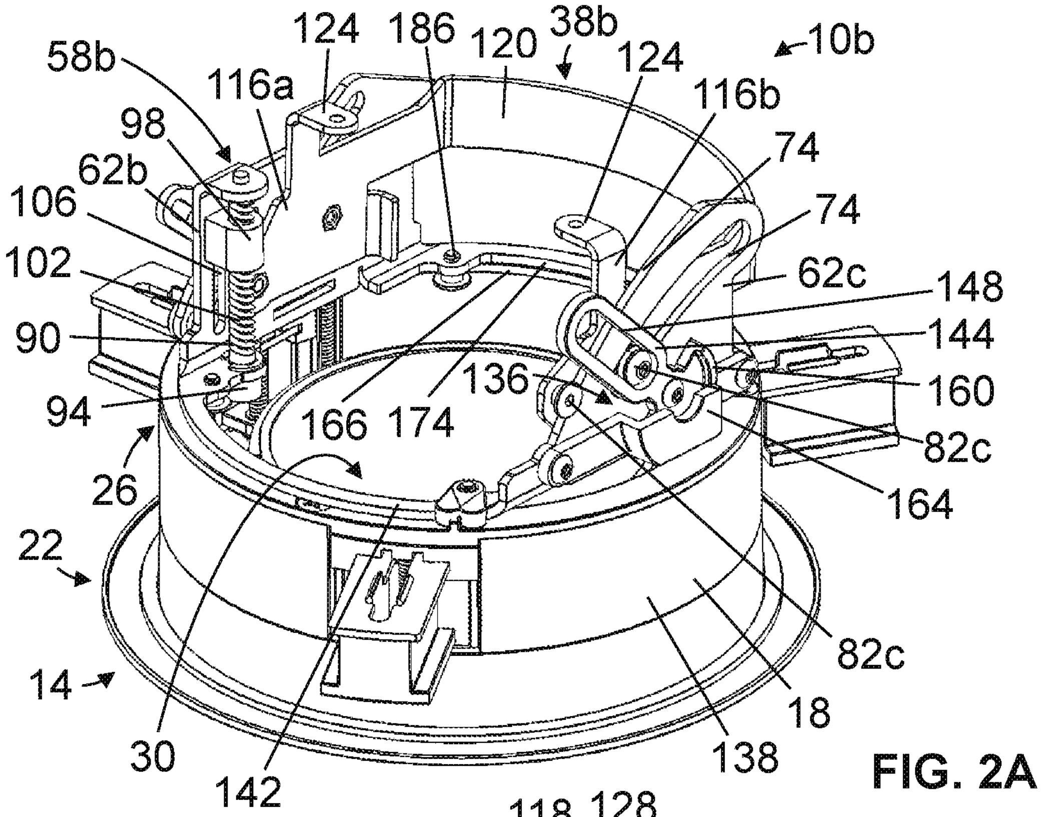
FIG. 2A is a perspective view of a second embodiment of the present light fixtures, shown without a light source.
Figure 2B:
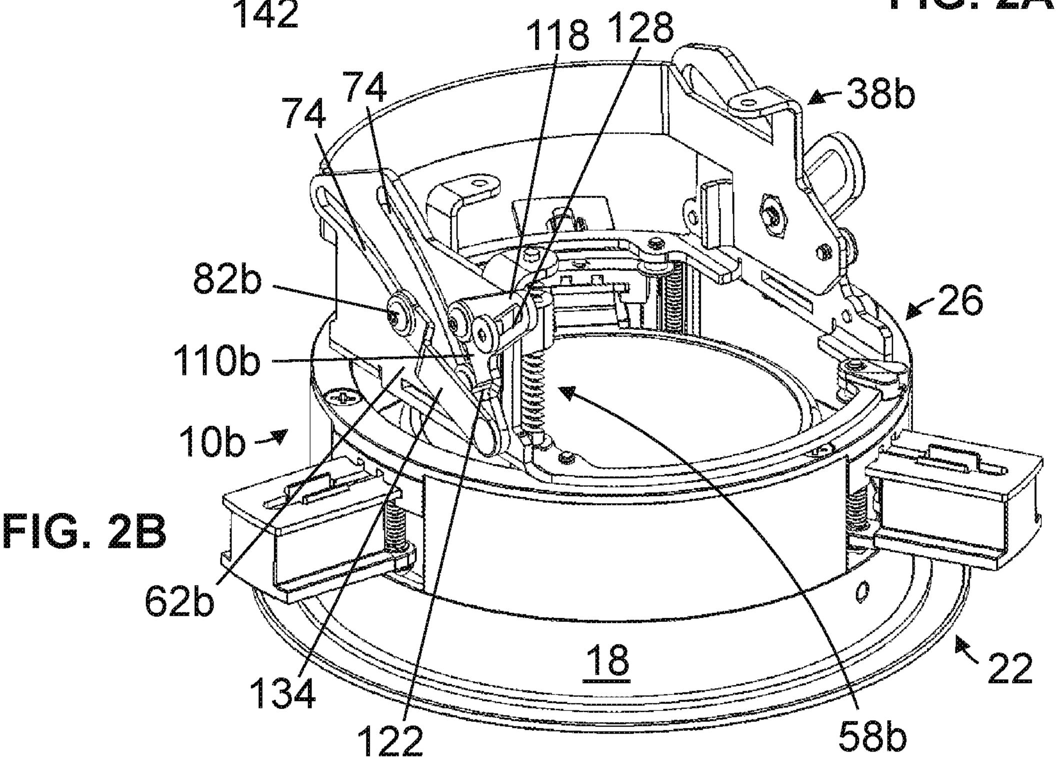
FIG. 2B is a perspective view of the embodiment of FIG. 2A.
Figure 2C:
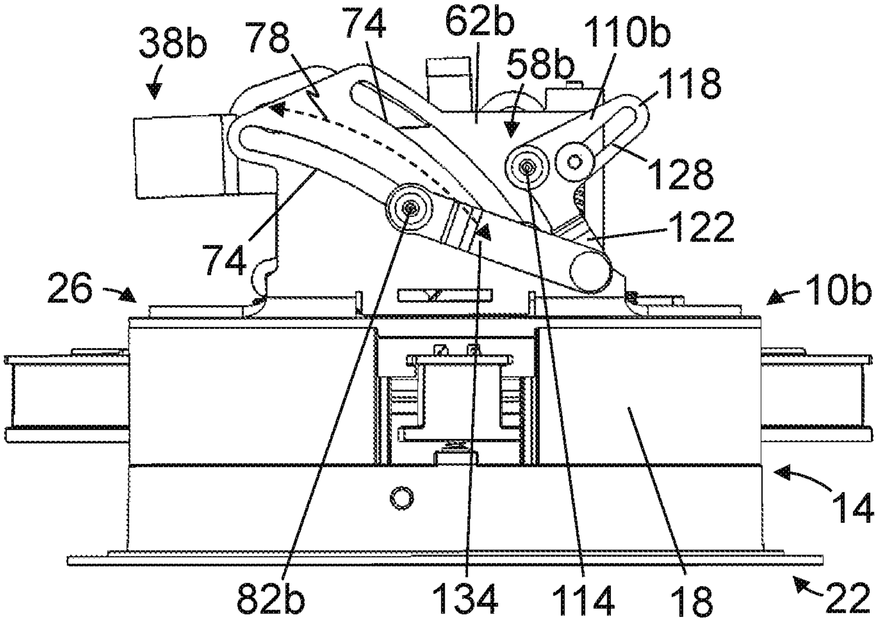
FIGS. 2C and 2D are right and left side views, respectively, of the embodiment of FIG. 2A.
Figure 2D:
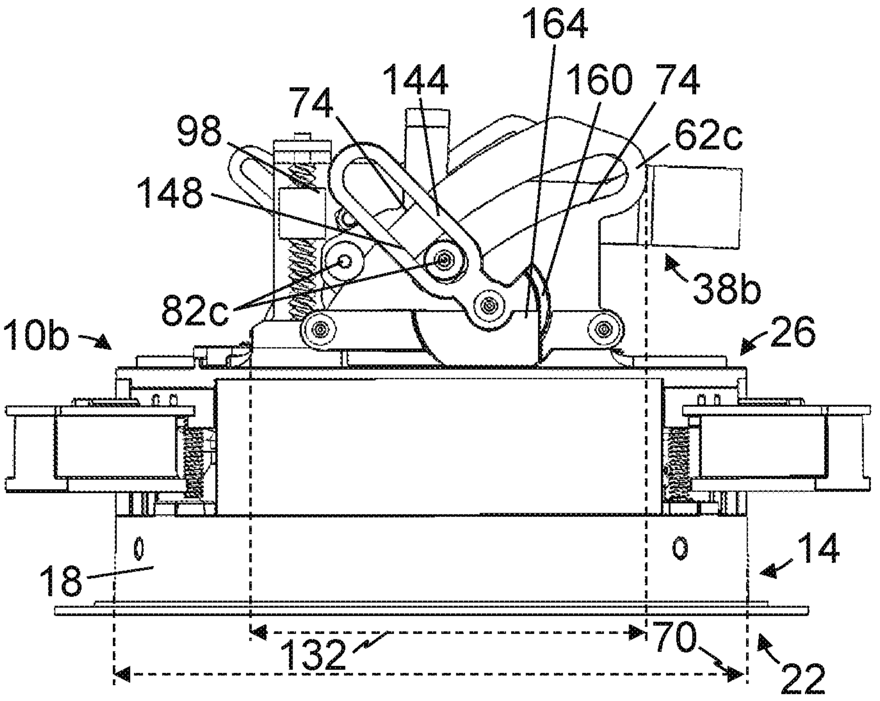
Figure 2E:
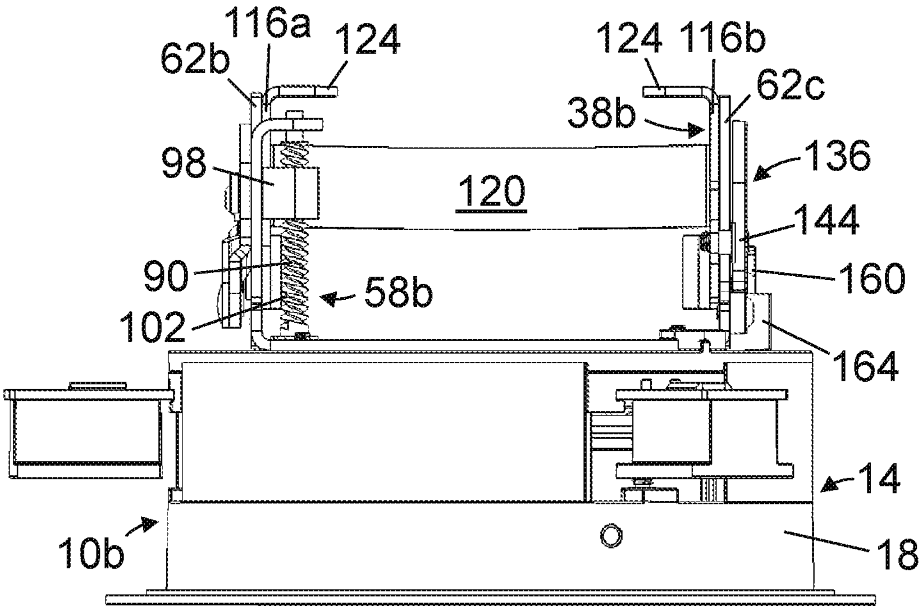
FIGS. 2E and 2F are front and back views, respectively, of the embodiment of FIG. 2A.
Figure 2F:
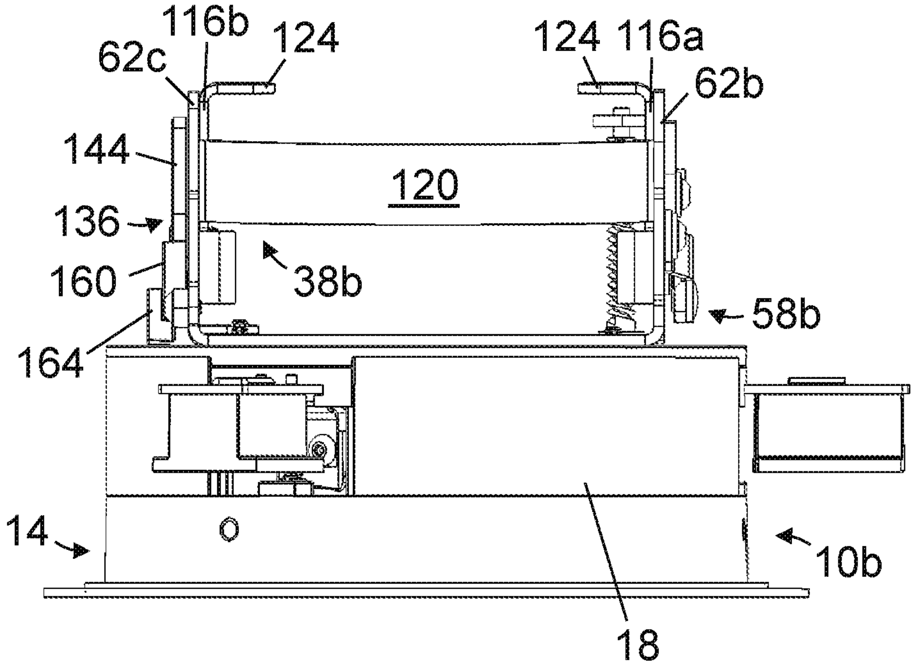
Figure 2H:
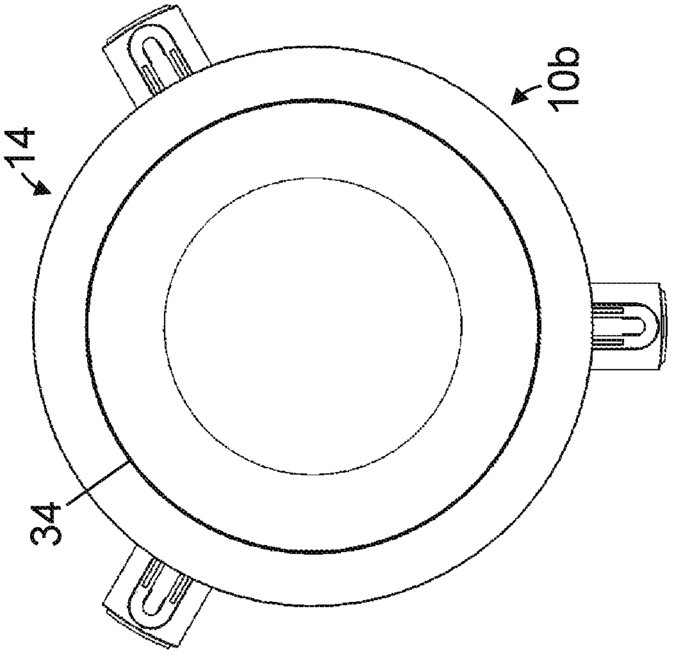
FIGS. 2G and 2H are top and bottom views, respectively, of the embodiment of FIG. 2A.
Figure 2G:
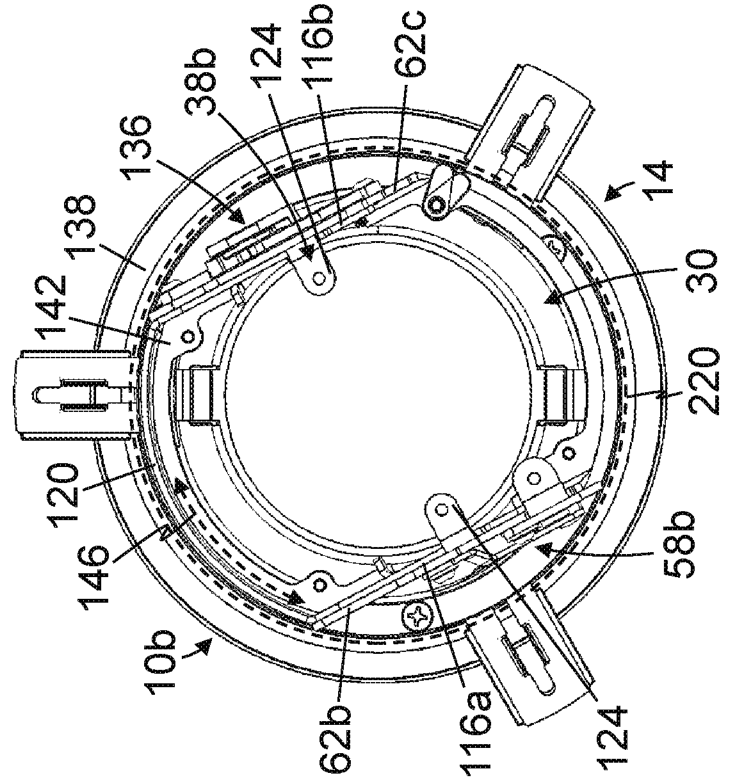

In this embodiment, rotatable portion 142 comprises an (e.g., annular) body 178 defining an opening in communication with interior passageway 30 (e.g., such that light from light source 42 may pass through the opening of body 178 and into interior passageway 30). In the depicted embodiment, rotatable portion 142 comprises a first retaining member 170 and a second retaining member 174 configured to be longitudinally spaced from the first retaining member, where the first and second retaining members are configured to receive ledge 166 therebetween (FIG. 3B). Such retaining members (e.g., 170 and 174) of the present bases (e.g., 14) may be unitary with a body (e.g., 178) of a respective rotatable portion (e.g., 142) (e.g., retaining member 174 is unitary with body 178) and/or coupled to the body of the respective rotatable portion (e.g., retaining member 170 is coupled to body 178 via one or more fasteners 186). In the embodiment shown, retaining members 170 and 174 are annular or ring-like; however, retaining members (e.g., 170 and/or 174) of the present bases (e.g., 14) may comprise any suitable structure. For instance, in fixture 10*b*, at least one of one or more fasteners 186 comprises a first retaining member 170; for example, in fixture 10*b*, ledge 166 is retained between a second retaining member 174 (e.g., which is unitary with body 178) and a head of the at least one fastener (FIG. 2A).

In the depicted embodiment, ledge 166 of stationary portion 138 is configured to be received between first and second retaining members, 170 and 174, respectively, such that an interface between the ledge and the retaining members is at least partially defined by one or more smooth surfaces. For example, in the embodiment shown, base 14 comprises one or more low-friction materials 182 disposable between ledge 166 and at least one of first and second retaining members, 170 and 174, respectively, such that the one or more low-friction materials define at least a portion of the interface between the ledge and the at least one of the first and second retaining members. Respective low-friction materials 182 of the present bases can comprise any suitable low-friction material, such as, for example, polytetrafluoroethylene, metals, such as copper, brass, aluminum, steel, and/or the like, plastics, composites, and/or the like, and such low-friction materials may have any suitable structure, such as, for example, a body, a film, a coating, and/or the like. However, in other embodiments, an interface between a ledge (e.g., 166) and a first retaining member (e.g., 170) and a second retaining member (e.g., 174) may be at least partially defined by a smooth surface (e.g., a smooth surface finish) of the ledge, the first retaining member, and/or the second retaining member (e.g., as in fixture 10*b*). In these ways and others, the present fixtures, and more particularly, bases of the present fixtures, may be configured to provide a smooth and consistent feel during rotational adjustment.

In the embodiment shown, a compression applied by retaining members 170 and 174 to ledge 166 may be adjustable, whereby a frictional force that resists rotation of rotatable portion 142 relative to stationary portion 138 can be varied. For example, in this embodiment, one or more fasteners 186 are configured to secure ledge 166 between retaining members 170 and 174, such that the one or more fasteners may be tightened or loosened to increase or decrease, respectively, a compression applied by the retaining members to the ledge. Through selection of a surface finish of ledge 166, a surface finish of retaining members 170 and/or 174, low-friction materials 182 (if present), the compressive force applied to the ledge by the retaining members, and/or the like, the characteristics (e.g., feel, resistive force, and/or the like) of rotation of rotatable portion 142 relative to stationary portion 138 can be varied.

In the depicted embodiment, as shown, no components associated with rotation of rotatable portion 142 relative to stationary portion 138 extend beyond an outer perimeter 220 defined by sidewall 18 (e.g., rotatable portion 142, or body 178 thereof, ledge 166, first retaining member 170, second retaining member 174, low-friction materials 182, fasteners 186, and/or the like). In other embodiments, such rotatable coupling of a rotatable portion relative to a respective stationary portion can be accomplished in any suitable fashion, and the description of base 14 is provided only by way of illustration.

Figure 4:
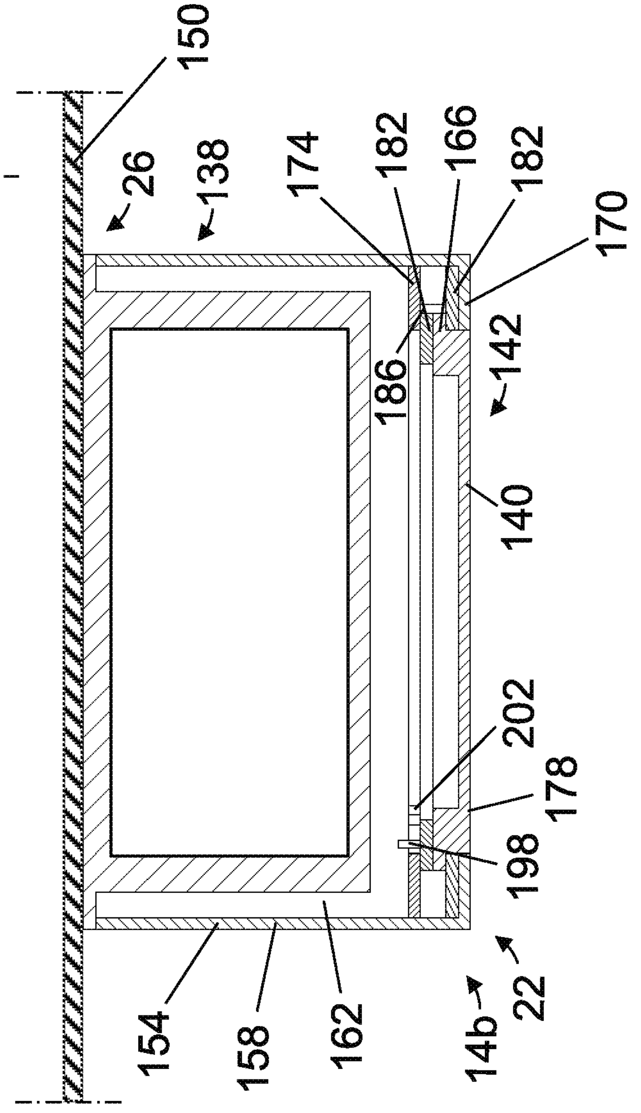
FIG. 4 is a partially cutaway and cross-sectional side view of a second embodiment of the present bases.

Referring now to FIG. 4, shown therein and designated by the reference numeral **14*b* is a second embodiment of the present bases. Base 14*b* may be substantially similar to base 14, with the primary differences described below. In the embodiment shown, base 14*b* does not define an aperture (e.g., base 14*b* is closed on second end 26 and/or first end 22). Nevertheless, stationary portion 138 (e.g., or a body 154 thereof) defines an interior volume 162, which may be sized to receive lighting components (e.g., a power supply, control circuitry, other lighting components, and/or the like). In this embodiment, stationary portion 138 is configured to secure base 14*b* (e.g., generally at second end 26) relative to structure 150, and rotatable portion 142 is configured to be coupled to a light source (e.g., 42) (e.g., at mounting surface 140**).

In the depicted embodiment, ledge 166 may comprise a component and/or portion of rotatable portion 142, and first retaining member 170 and second retaining member 174 may comprise a component and/or portion of stationary portion 138. In these and similar embodiments, ledge 166 may be unitary with rotatable portion 142 (e.g., or a body 178 thereof), and/or first and/or second retaining members, 170 and 174, respectively, may be unitary with stationary portion 138 (e.g., or a body 154 thereof).

In this embodiment, base **14*b* includes a protrusion or stop 198 that extends longitudinally from rotatable portion 142 and is configured to rotate with the rotatable portion. In this way, rotatable portion 142 may rotate, along with protrusion or stop 198, relative to stationary portion 138 until the protrusion or stop contacts a projection or tooth 202, which may be coupled in fixed relation to, and/or unitary with a body 154 of, stationary portion 138**, thus physically limiting the range of permitted rotation of the rotatable portion relative to the stationary portion.

Some embodiments of the present methods comprise rotating a rotatable portion (e.g., 142) of a light fixture (e.g., **10*a*, 10*b*, and/or the like) relative to a stationary portion (e.g., 138) of the light fixture, the rotatable portion configured to be coupled to a light source (e.g., 42) and the stationary portion configured to secure the light fixture to a structure (e.g., 150), where a ledge (e.g., 166) of the stationary portion is received between first and second retaining members (e.g., 170 and 174, respectively) of the rotatable portion, and where an interface between the ledge and the first and second retaining members is at least partially defined by one or more smooth surfaces. In some embodiments, the light fixture comprises one or more low friction materials (e.g., 182**) disposed between the ledge and at least one of the first and second retaining members, the one or more low-friction materials defining at least a portion of the interface between the ledge and the at least one of the first and second retaining members.

Some embodiments of the present methods comprise rotating a rotatable portion (e.g., 142) of a light fixture (e.g., **10*a*, 10*b*, and/or the like) relative to a stationary portion (e.g., 138) of the light fixture, the rotatable portion configured to be coupled to a light source (e.g., 42) and the stationary portion configured to secure the light fixture to a structure (e.g., 150), where a ledge (e.g., 166) of the rotatable portion is received between first and second retaining members (e.g., 170 and 174**, respectively) of the stationary portion, and where an interface between the ledge and the first and second retaining members is at least partially defined by one or more smooth surfaces.

Referring additionally to FIGS. 5A-5E, shown therein and designated by the reference numeral 214 is one embodiment of the present mounts. In the embodiment shown, mount 214 may be substantially similar to and/or comprise base 14 (though, in some embodiments, as shown, rotatable portion 142 and associated components, such as, for example, first retaining member 170, second retaining member 174, low-friction materials 182, and/or the like may be omitted). While, in the present disclosure, mount 214 is sometimes described as a component of and/or with reference to fixture **10*a* (e.g., with some components introduced and described above, particularly with respect to base 14**), the present mounts can be a component of and/or used with any suitable fixture.

In the embodiment shown, mount 214 comprises one or more latching mechanisms 216 extending from sidewall 18 and/or sidewall 158 and into interior passageway 30. In this embodiment, one or more latching mechanisms 216 are configured to releasably secure light fixture components (e.g., shroud assembly **264*a* or 264*b*, each described in more detail below) relative to the mount. For example, in the depicted embodiment, latching mechanisms 216** comprise ball plungers; however, other embodiments may comprise any suitable latching mechanisms, such as, for example, detents, slots, ridges, fasteners, and/or the like. In yet other embodiments, latching mechanisms may be omitted.

Figure 5E:
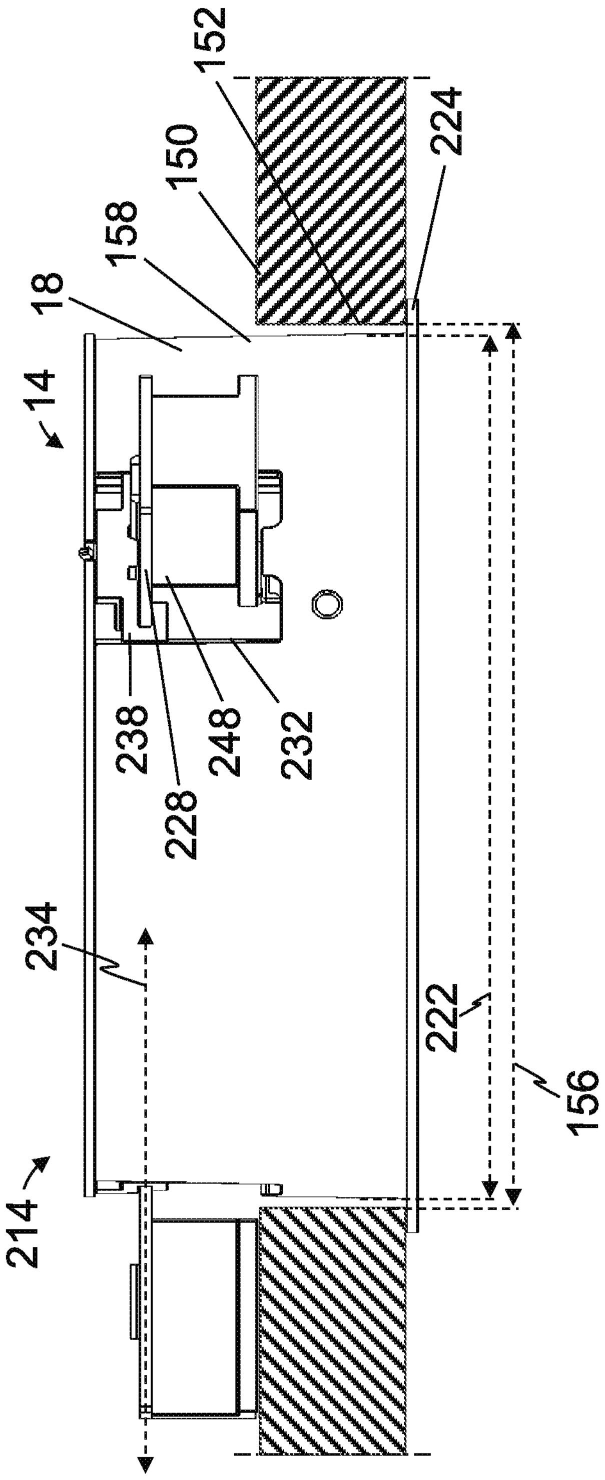
FIG. 5E is a partially cutaway and cross-sectional side view of the embodiment of FIG. 5A.
Figure 6A:
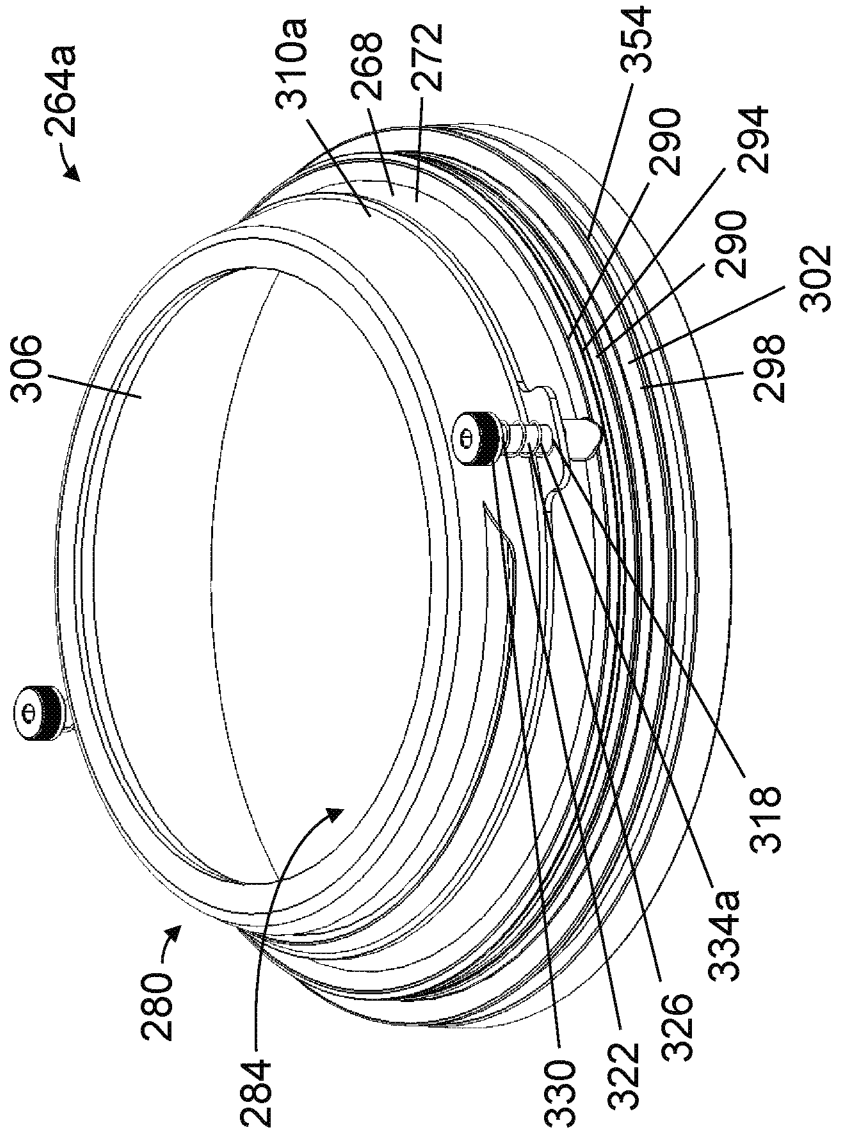
FIG. 6A is a perspective view of a first embodiment of the present shroud assemblies.
Figure 6B:
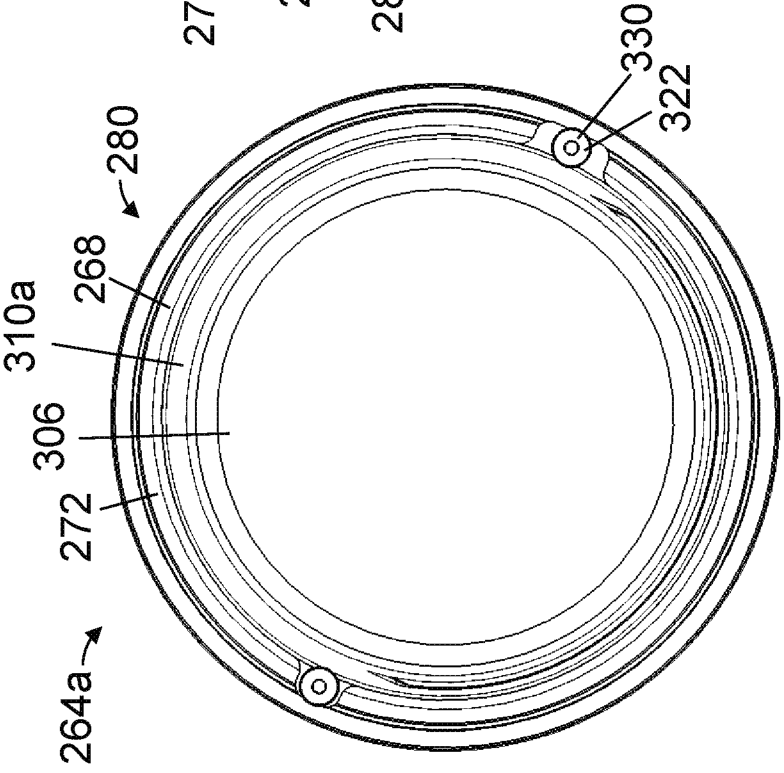
FIGS. 6B and 6C are top and bottom views, respectively, of the embodiment of FIG. 6A.
Figure 6C:
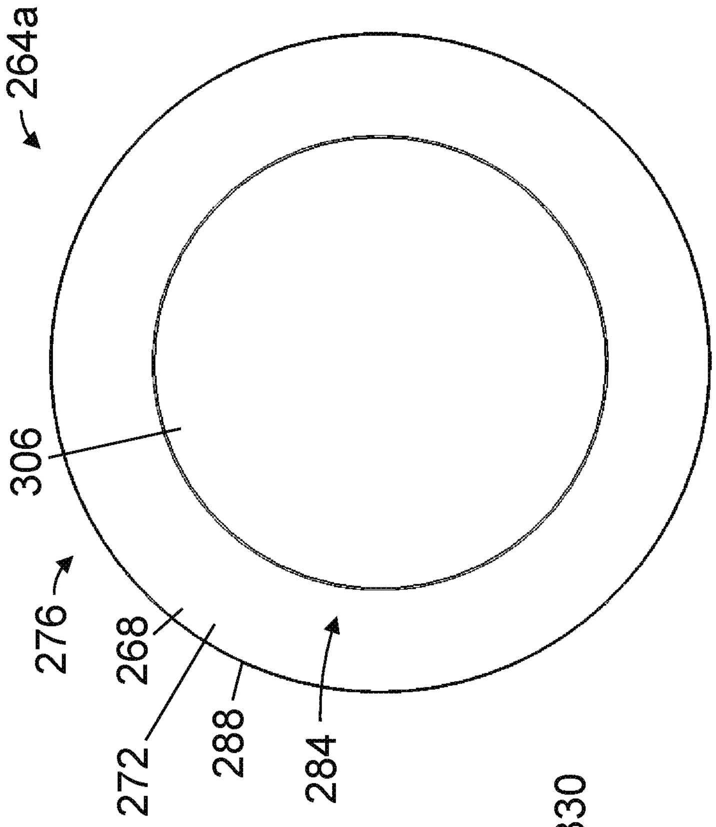
Figure 6D:
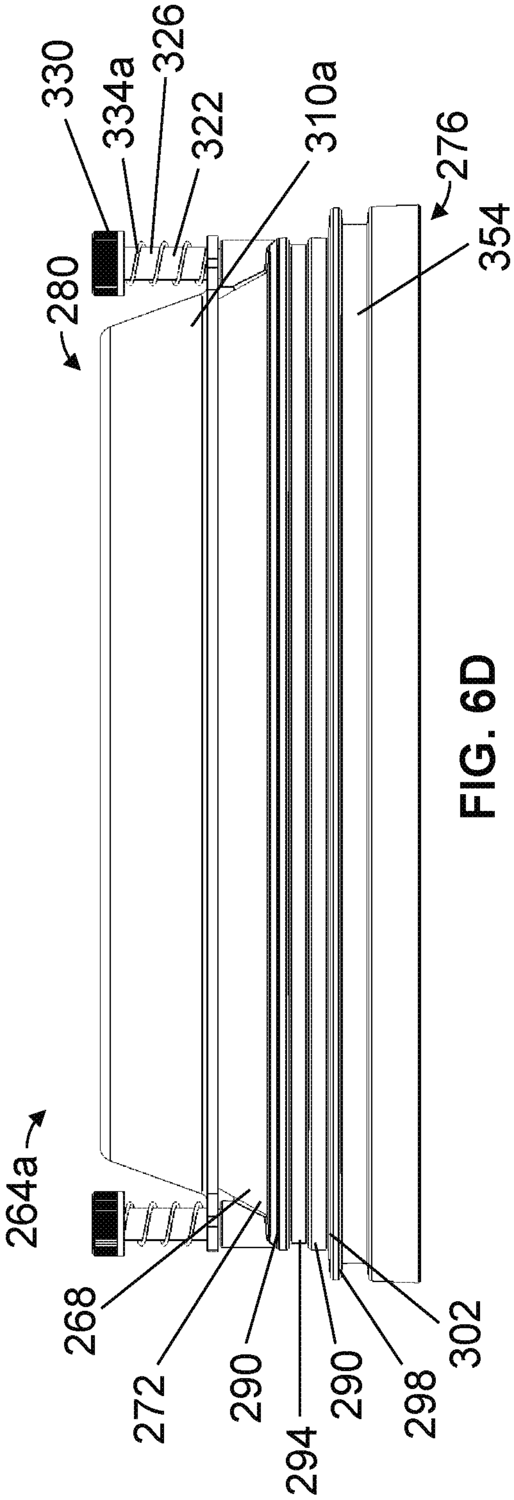
FIGS. 6D and 6E are opposing side views of the embodiment of FIG. 6A.
Figure 6E:
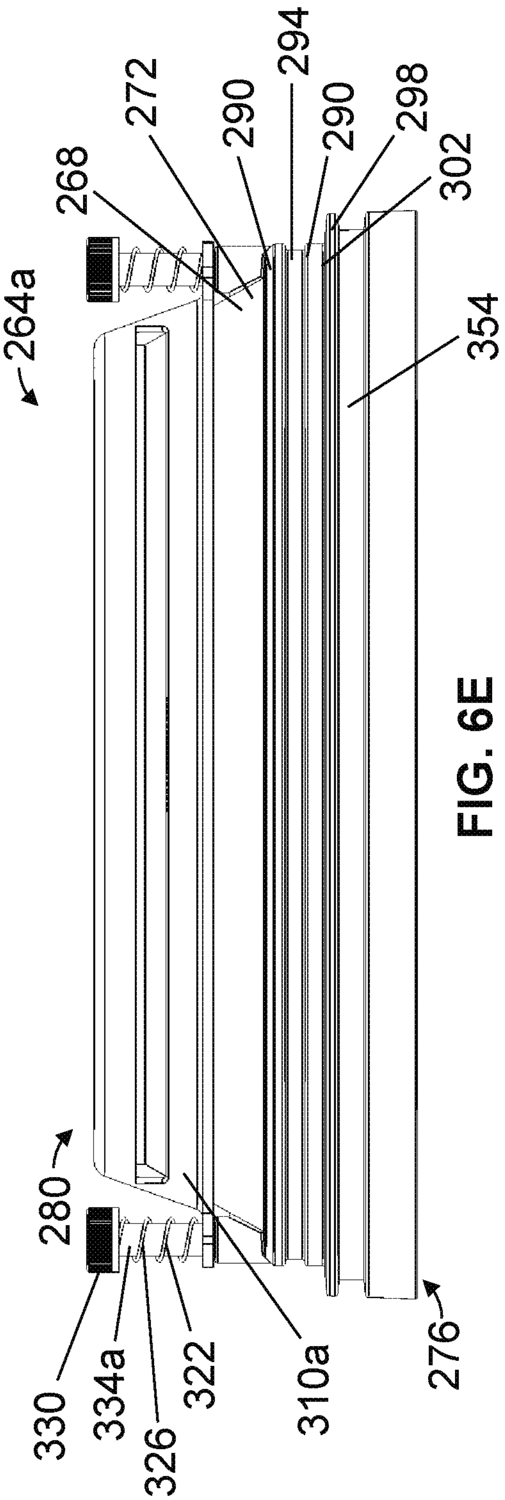
Figure 6F:
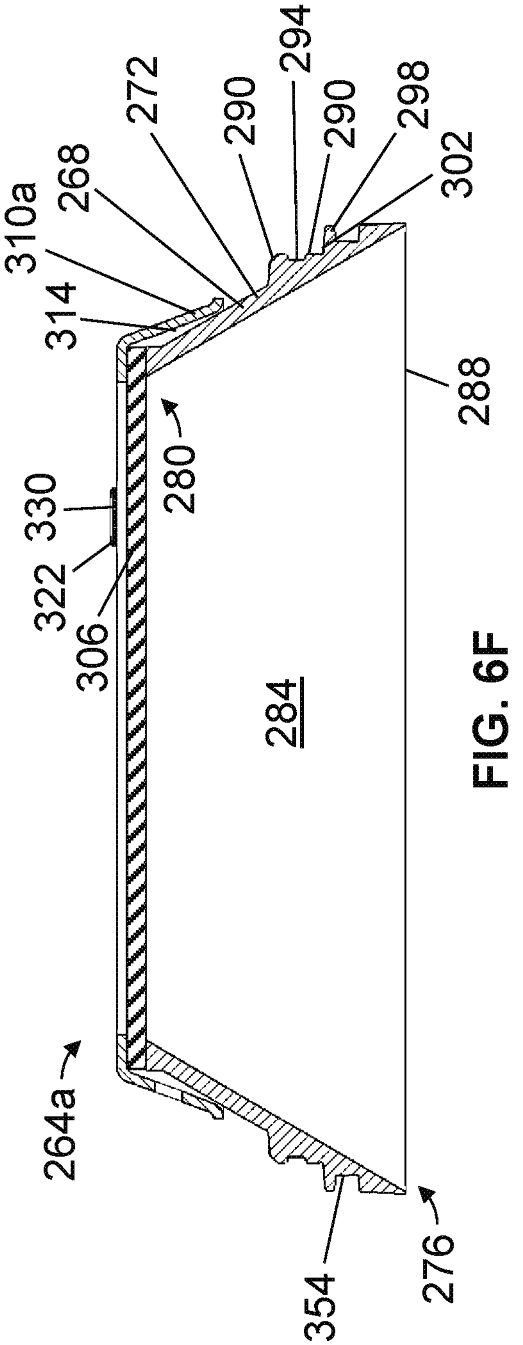
FIG. 6F is a cross-sectional side view of the embodiment of FIG. 6A, shown with a lens in a first position relative to a shroud.
Figure 6G:
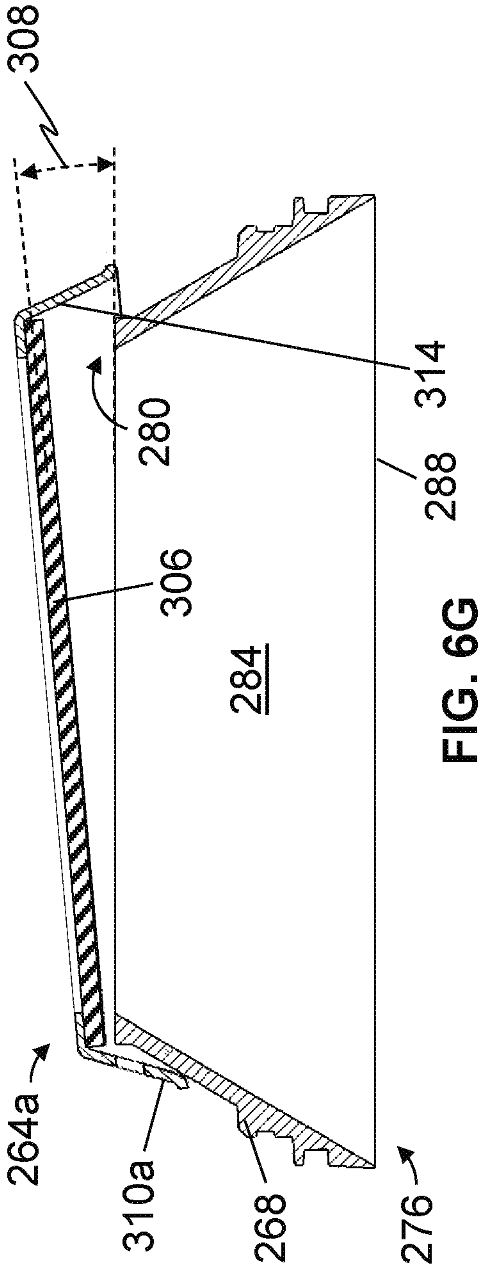
FIG. 6G is a cross-sectional side view of the embodiment of FIG. 6A, shown with a lens in a second position relative to a shroud.
Figure 7A:
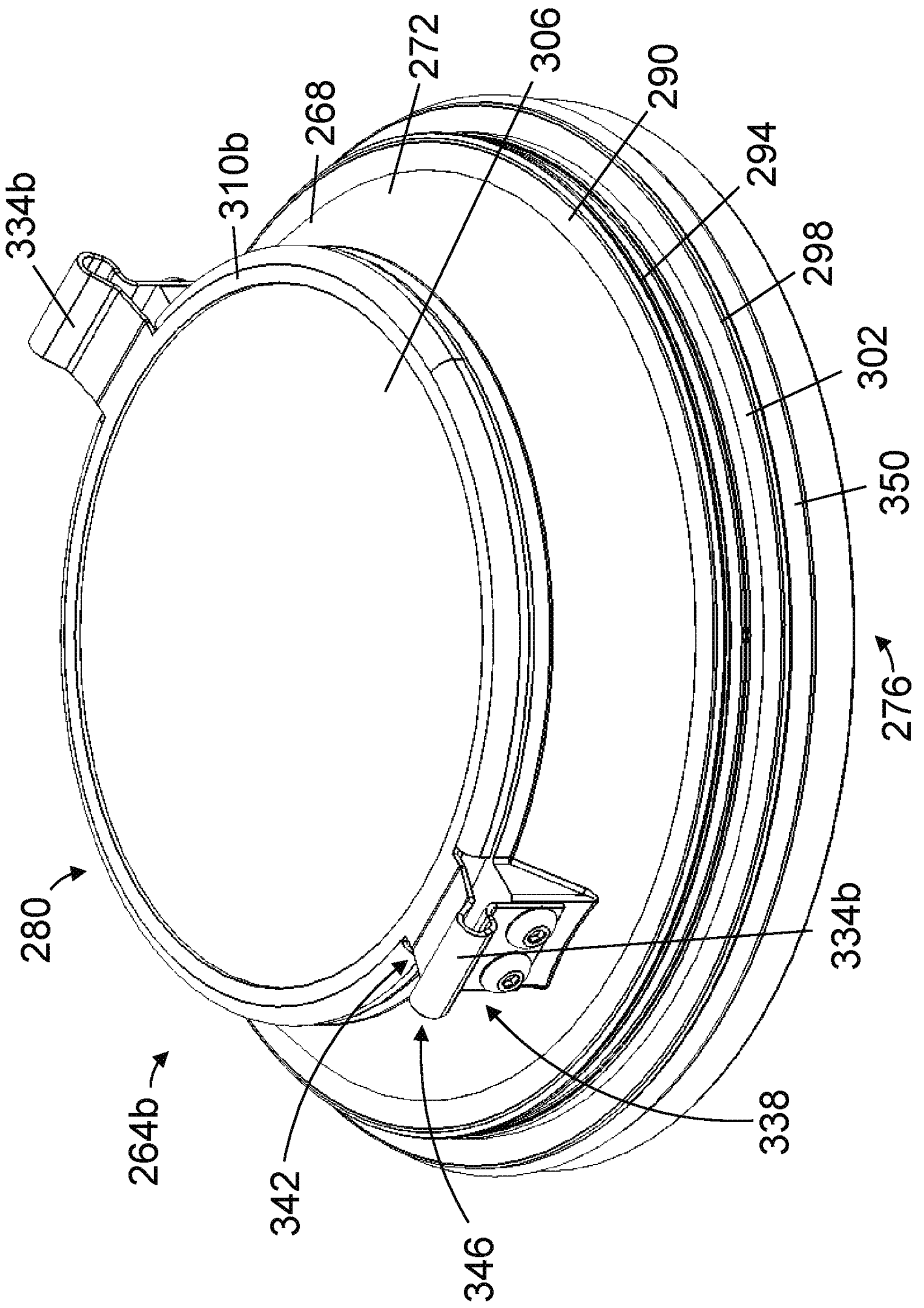
FIG. 7A is a perspective view of a second embodiment of the present shroud assemblies.
Figure 7C:
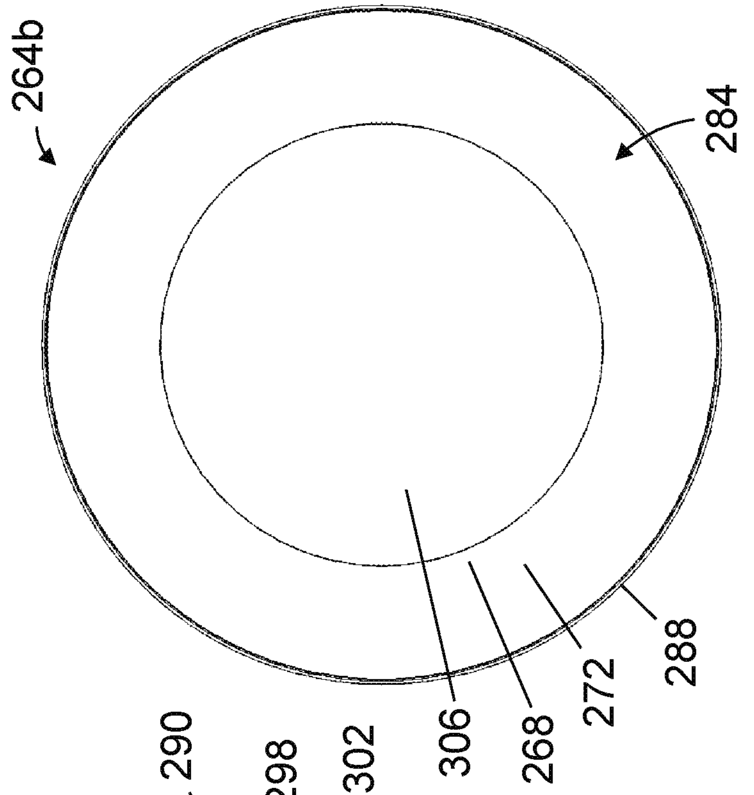
FIGS. 7B and 7C are top and bottom views, respectively, of the embodiment of FIG. 7A.
Figure 7B:
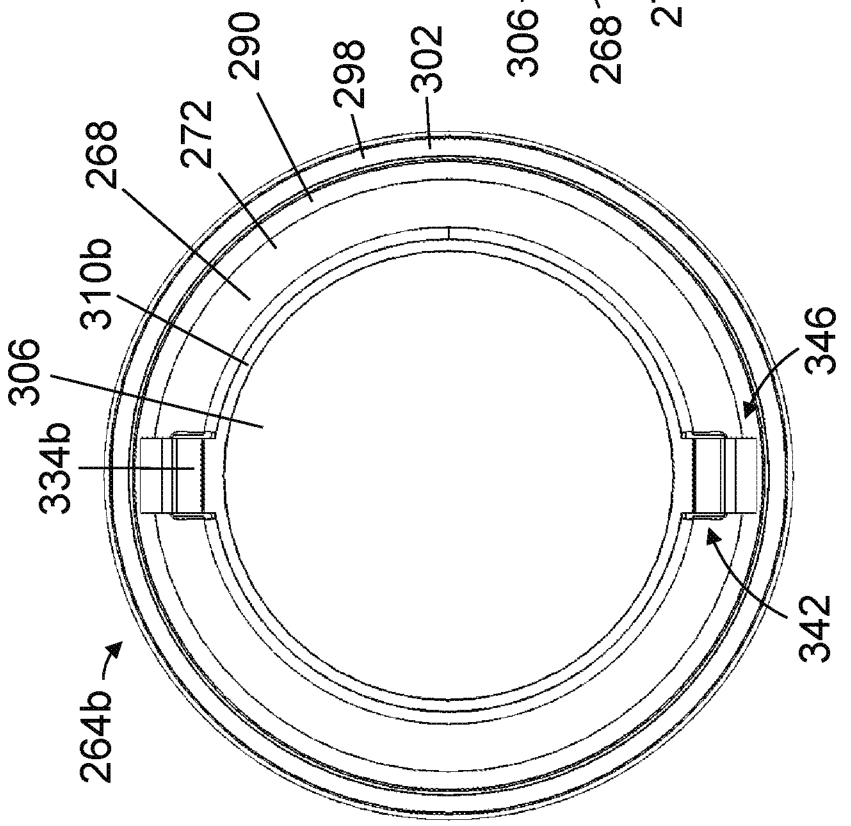
Figure 7D:
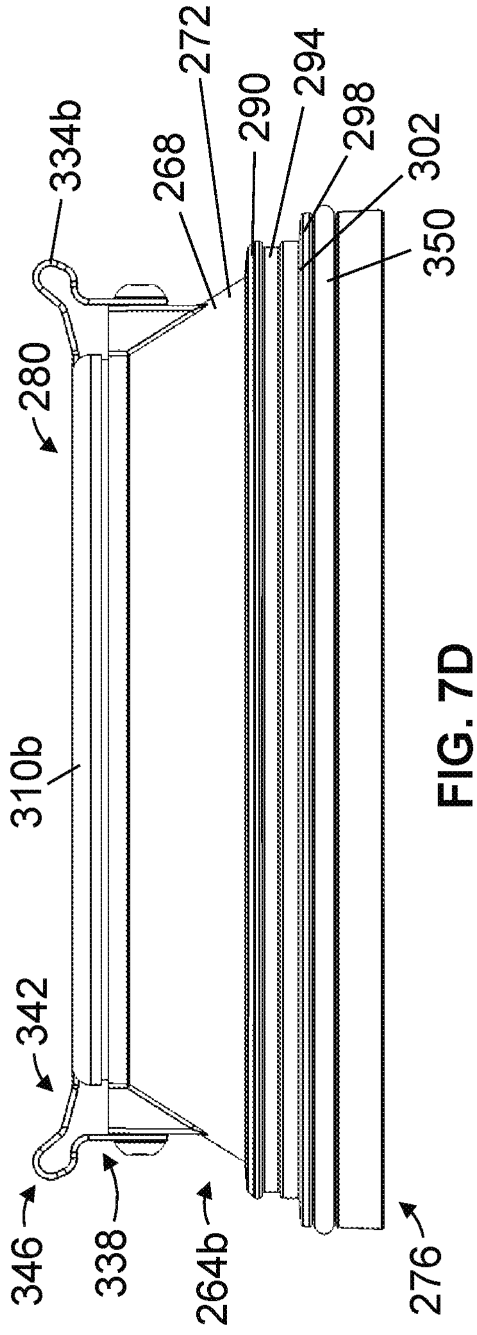
FIG. 7D is a side view of the embodiment of FIG. 7A.
Figure 7E:
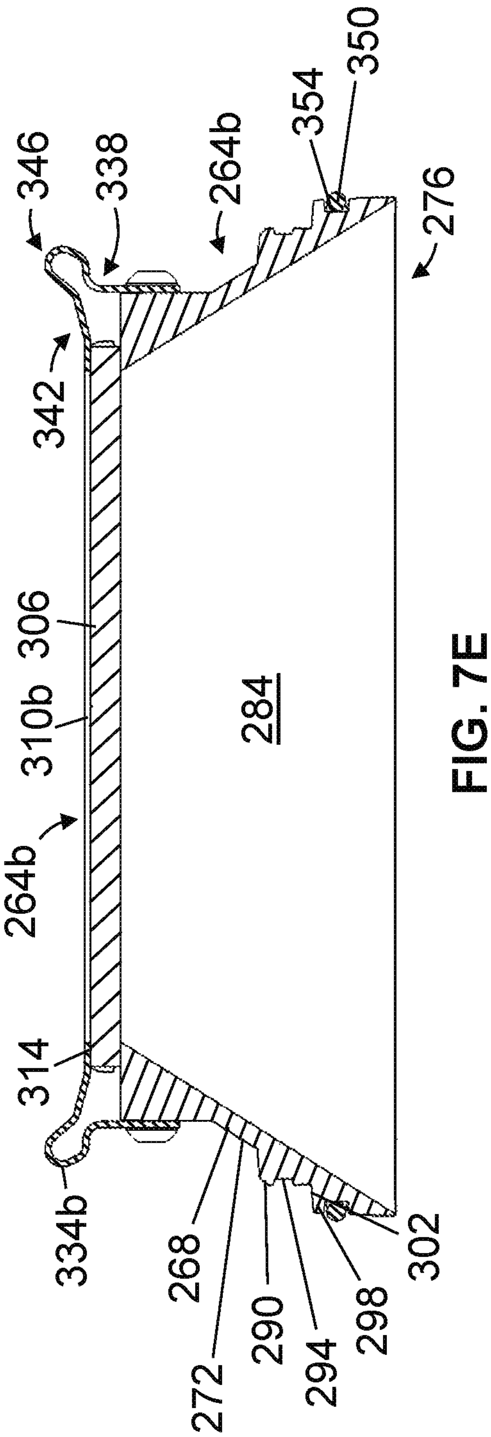
FIG. 7E is a cross-sectional side view of the embodiment of FIG. 7A.

In the embodiment shown, sidewall 18 defines an outer perimeter 220 and a transverse dimension 222 (FIG. 5E). In this embodiment, first end 22 of base 14 defines and/or comprises a lip 224 that extends outwardly from sidewall 18 and beyond outer perimeter 220. At least due to the retractable nature of mounting tabs 228, some embodiments of the present mounts can be configured to be received within a relatively small opening in a structure (e.g., having a perimeter that substantially corresponds to outer perimeter 220), as described in more detail below. In these and similar embodiments, lip 224 may function as a trim ring (e.g., some embodiments of present mounts may be used without an external trim or "goof" ring). In the embodiment shown, lip 224 comprises a substantially planar surface, uninterrupted by mounting features (e.g., tabs, fasteners, and/or the like). In this embodiment, lip 224 defines a groove 226, which may be configured to receive an O-ring, gasket, seal, and/or the like (e.g., to seal the mount against structure 150) (e.g., the present mounts may be suitable for use in dry, damp, or wet mount light fixture installations).

In the embodiment shown, mount 214 comprises one or more mounting tabs 228 movably coupled to base 14. In this embodiment, mount 214 comprises three (3) mounting tabs 228; however, other embodiments may comprise any suitable number of respective mounting tabs, such as, for example, 1, 2, 3, 4 5, or more mounting tabs. In the depicted embodiment, each mounting tab 228 is movable between a deployed state (FIG. 5B), in which at least a portion of the mounting tab extends outwardly from base 14 and beyond outer perimeter 220, and a retracted state (FIG. 5C), in which a majority of (e.g., up to and including all of) the mounting tab is disposed within the outer perimeter (e.g., and, in some embodiments, within interior volume 162 and/or interior passageway 30). In the embodiment shown, each of mounting tabs 228 is axially (e.g., and laterally) movable between the retracted state and the deployed state (e.g., generally along a direction indicated by arrow 234, via slidable engagement with tracks 238 coupled to sidewall 18 and/or sidewall 158); however, in other embodiments, the respective mounting tabs may be rotatably movable (e.g., in a lateral plane) between the deployed state and the retracted state. In some embodiments, each of one or more mounting tabs 228 may be biased towards the deployed state (e.g., via one or more springs and/or the like, which may be coupled between the mounting tab and sidewall 18 and/or sidewall 158), and in some embodiments, each of the one or more mounting tabs may be biased towards the retracted state (e.g., in a same or similar fashion).

In this embodiment, sidewall 18 defines one or more openings 232, each configured to receive at least a portion of one of one or more mounting tabs 228 as the mounting tab moves between the deployed state and the retracted state (e.g., to allow the mounting tab to move between the retracted state and the deployed state unhindered by sidewall 18). In the depicted embodiment, each of one or more mounting tabs 228 comprises a portion 230 that, when the mounting tab is the deployed state, is disposed within interior volume 126 and/or interior passageway 30 and accessible through aperture 34. In this way, one or more mounting tabs 228 may be readily movable from the deployed state to the retracted state via access through aperture 34 (e.g., when installing and/or removing mount 214 into and/or from a structure 150).

In the embodiment shown, mount 214 comprises one or more retaining posts 236, each configured to limit outward movement of one of one or more mounting tabs 228 beyond the deployed state and inward movement of the mounting tab beyond the retracted state. For example, in this embodiment, each retaining post 236 is received within a slot 240 of a mounting tab 228, whereby the slot and retaining post cooperate to physically limit movement of the mounting tab relative to the base beyond the deployed state and/or beyond the retracted state.

In the depicted embodiment, one or more retaining posts 236 may be configured to selectively and releasably secure one or more mounting tabs 228 relative to base 14. To illustrate, in the embodiment shown, each retaining post 236 comprises a (e.g., threaded) fastener 244, which may be tightened to secure a mounting tab 228 relative to base 14 (e.g., between or at the retracted state and/or the deployed state), and loosened to allow movement of the mounting tab relative to the base between the retracted state and the deployed state. For example, in this embodiment, each fastener 244 is received by a threaded portion of a track 238, and each track 238 is slidably engaged with an opening 232, where threading of the fastener causes the track, and a mounting tab 228 received within the track, to longitudinally move relative to base 14 (e.g., generally along a direction indicated by arrow 242). In this way, for example, a structure (e.g., 150) may be received longitudinally between a deployed mounting tab 228 (or a support 248 attached to the mounting tab) and lip 224, and a fastener 244 may be tightened to secure the mounting tab relative to mount 214 (e.g., by engaging the mounting tab or support with an interior surface of the structure) (e.g., thus securing the mount 214 relative to the structure).

In the embodiment shown, each of one or more retaining posts 236 are disposed within outer perimeter 220 (e.g., and within interior volume 162 and/or interior passageway 30). By minimizing and/or eliminating mounting hardware (e.g., mounting tabs 228, retaining posts 236, latching mechanisms 216 and/or the like) disposed outside of outer perimeter 220, and particularly during installation and/or removal of the present mounts (e.g., when mounting tabs 228 may be in the retracted state), the present mounts may be configured to be received within a relatively small opening 152 in a structure. For example, in this embodiment (FIG. 5E), opening 152 may substantially correspond to outer perimeter 220, having a transverse dimension 156 substantially equal to a transverse dimension 222 defined by sidewall 18.

In the depicted embodiment, each of one or more mounting tabs 228 comprises a support 248 that extends from the mounting tab and towards first end 22 of base 14. In the embodiment shown, each of one or more supports 248 is configured to rest on an interior surface of a structure 150 (e.g., a wall, ceiling, floor, and/or the like), when the mount is installed within the structure (FIG. 5E). Thus, one or more supports 248 may function to support the mount and/or a light fixture coupled to the mount against inadvertent separation of the mount and/or light fixture from the structure. In this embodiment, each support 248 is removably coupled to one of one or more mounting tabs 228. For example, in the depicted embodiment, each support 248 comprises one or more snap-fit or latching members 252 configured to be received within an enlarged portion 258 of a slot 240 of a mounting tab 228 (e.g., such that the snap-fit or latching members, when the support is coupled to the mounting tab, do not interfere with slidable engagement of the slot with a retaining post 236). However, in other embodiments, the respective supports can be coupled to the respective mounting tabs in any suitable fashion, such as, for example, via fasteners, adhesive, and/or the like. In at least this way, the present mounts, and more particularly, respective mounting tabs of the present mounts, may be used with a variety of supports 248 of differing sizes (e.g., heights), such that the present mounts can be configured to be mounted within and/or to various structures 150 (e.g., having various thicknesses). However, in other embodiments, one or more respective supports may be integrally formed one or more respective mounting tabs.

Some embodiments of the present methods for installing a light fixture comprise inserting a base (e.g., 14) of a mount (e.g., 214) into an opening (e.g., 152) in a wall, ceiling, or floor (e.g., structure 150), the base comprising a sidewall (e.g., 18) extending between a first end (e.g., 22) and a second end (e.g., 26), the sidewall defining an outer perimeter (e.g., 220), and moving one or more mounting tabs (e.g., 228) of the mount between a deployed state (FIG. 5B) in which at least a portion of each of the one or more mounting tabs extends outwardly from the base and beyond the outer perimeter, and a retracted state (FIG. 5C), in which a majority of (e.g., up to and including all of) each of the one or more mounting tabs is disposed within the outer perimeter.

Referring now to FIGS. 6A-6G, shown therein and designated by the reference numeral 264*a* is a first embodiment of the present removable shroud assemblies. While, in the present disclosure, shroud assembly 264*a* is sometimes described as a component of and/or with reference to fixture 10*a* (FIG. 1I), the present shroud assemblies can be used in and/or with any suitable fixture. In the embodiment shown, shroud assembly 264*a* comprises a shroud 268 having a sidewall 272 extending between a first end 276 and a second end 280 to define an interior passageway 284. In this embodiment, first end 276 defines an aperture 288, whereby light may travel from second end 280 to first end 276 through the interior passageway and exit through aperture 288. In the depicted embodiment, shroud 268 is rounded (e.g., shroud 268, or a portion thereof, has a circular cross-section); however, in other embodiments, the present shroud assemblies can comprise respective shrouds having any suitable shape (e.g., having cross-sections that are circular, elliptical, and/or otherwise rounded, triangular, square, rectangular, and/or otherwise polygonal, and/or the like).

In the embodiment shown, shroud assembly 264*a*, and more particularly shroud 268, is configured to be removably coupled to and/or within a light fixture (e.g., a recessed light fixture) (e.g., light fixture 10*a*, and more particularly, to and/or within base 14 and/or mount 214). For example, in this embodiment, shroud 268 comprises one or more projections or ribs 290 extending from sidewall 272 and away from interior passageway 284, the one or more projections or ribs configured to removably couple the shroud to and/or within a light fixture (e.g., by interfacing with latching mechanisms 216 of mount 214). For further example, in the depicted embodiment, two projections or ribs 290 are longitudinally spaced apart from one another to define an (e.g., annular) groove 294, within which latching mechanisms 216 of mount 214 may be received. In the embodiment shown, shroud assembly 264*a*, and more particularly, shroud 268, is sized to be closely received within base 14 and/or mount 214. For example, in this embodiment, aperture 288 of shroud 268 substantially corresponds to aperture 34 of base 14 (e.g., aperture 288 has a perimeter having a substantially similar size and shape to a perimeter of aperture 34, as shown in FIG. 1I), and aperture 288 may be substantially co-planar with aperture 34.

In the embodiment shown, shroud 268 comprises a ledge or shelf 298, which defines a lip 302 configured to locate and/or physically limit movement of the shroud assembly relative to a light fixture (e.g., aligning shroud assembly 264*a* within base 14 and/or mount 214, for example, such that aperture 34 is substantially parallel with aperture 288, preventing the shroud assembly from being inserted into the base and/or mount beyond a desired distance from first end 22 towards second end 26, and/or the like). In this embodiment, ledge or shelf 298 and/or lip 302 may function to (e.g., physically) resist undesired movement of shroud 268 relative to base 14 and/or mount 214 as lens 306 is moved relative to the shroud, as described below.

In the depicted embodiment, shroud assembly 264*a* comprises a lens 306 movably coupled to second end 280 of shroud 268 and accessible through interior passageway 284. For example, in the embodiment shown, lens 306 is movable relative to shroud 268 between a first position (FIG. 6F) and a second position (FIG. 6G), in which a portion of the lens is not in contact with second end 280 of the shroud (e.g., such that, in the second position, lens 306 is angularly displaced at a non-zero angle 308 relative to the second end of the shroud). Thus, in this embodiment, second end 280 (e.g., and/or an edge and/or surface thereof) of shroud 268 is accessible through interior passageway 284 when lens 306 is in the second position. In this way, a user, via access through interior passageway 284 and whether or not using an implement, may cause lens 306 to displace to the second position, whereby a surface or edge of second end 280 may be available to the user to facilitate removal of the shroud assembly from a fixture (e.g., by presenting an edge or surface to the user to which a longitudinal removing force can be applied). In at least this way, the present removable shroud assemblies may be configured to be removed from a light fixture (e.g., 10*a*, 10*b*, and/or the like) and/or a base (e.g., 14) and/or mount (e.g., 214), without requiring features (e.g., tabs, recesses, notches, and/or the like) disposed in a path of light from the fixture (e.g., extending into interior passageway 284) (e.g., surfaces of sidewall 272 facing interior passageway 284 are smooth).

In the depicted embodiment, shroud assembly 264*a* comprises a lens retaining cup 310*a* configured to locate lens 306 relative to shroud 268 when the lens is between and/or at the first position and/or second position. For example, in the embodiment shown, lens retaining cup 310*a* defines a recess 314 within which lens 306 may be received such that the lens retaining cup, via recess 314, physically limits undesirable (e.g., lateral) movement of lens 306 relative to shroud assembly 264*a*, and more particularly, shroud 268. For further example, in this embodiment, lens retaining cup 310*a* is configured to overlie at least a portion of sidewall 272 when lens 306 is in the first position (e.g., recess 314 is dimensioned to receive a portion of shroud 268, which may facilitate locating and/or securing of lens 306 between lens retaining cup 310*a* and shroud 268 when the lens is in the first position). In the depicted embodiment, lens retaining cup 310*a* and lens 306 are separate components that may or may not be attached to one another; however, in other embodiments, respective lens retaining cups may be integrally formed with respective lenses.

In the embodiment shown, lens retaining cup 310*a* comprises one or more openings or slots 318 and is coupled to shroud 268 via one or more fasteners 322, each disposed through an opening or slot 318 and received by shroud 268. In this embodiment, such coupling is movable in that each opening or slot 318 is configured to slidably engage a fastener 322 at a shaft portion 326, such that, as lens 306 is moved between the first position and the second position, the opening or slot, and thus the lens retaining cup and/or lens, may move relative to the fastener, and thus shroud 268. In the depicted embodiment, fasteners 322 may be configured to limit movement of lens 306 and/or retaining cup 310*a* relative to shroud 268. For example, as shown, each fastener 322 comprises a head 330 sized such that the head portion cannot pass through a corresponding opening or slot 318 (e.g., to physically limit movement of the lens retaining cup and/or lens relative to the shroud). However, in other embodiments, movable coupling of a lens relative to a respective shroud can be accomplished in any suitable fashion, and the description of shroud assembly 264*a* is provided only by way of illustration.

In the embodiment shown, lens 306 and/or lens retaining cup 310*a* is biased towards the first position. For example, in this embodiment, shroud assembly 264*a* comprises one or more springs 334*a* configured to bias the lens and/or lens retaining cup towards the first position. To illustrate, in the depicted embodiment, each spring 334*a* is disposed around a shaft portion 326 of a fastener 322 and retained between lens retaining cup 310*a* and a head 330 of the fastener (e.g., thus supplying a biasing force tending to hold the lens retaining cup and/or lens in the first position).

Referring now to FIGS. 7A-7E, shown therein and designated by the reference numeral 264*b* is a second embodiment of the present removable shroud assemblies. Shroud assembly 264*b* may be substantially similar to shroud assembly 264*a*, with the primary exceptions described below. In the embodiment shown, one or more springs 334*b* may be characterized as cantilever springs, each comprising a first portion 338 coupled or couplable to shroud 268 (e.g., via fasteners) and a second portion 342 coupled or couplable to lens retaining cup 310*b*. In this embodiment, for each spring 334*b*, first portion 338 is angularly disposed relative to second portion 342, such that, for example, the first and second portions define a generally V-shaped cross-section (e.g., when lens 306 is in the first position relative to shroud 268). In the depicted embodiment, first portion 338 of each spring 334*b* is coupled to second portion 342 of the spring via a third, generally open portion 346 that extends from and away from (e.g., outwardly or inwardly, relative to a respective plane of) one or each of the first and second portions (e.g., providing additional spring material and thereby permitting a larger range of relative elastic movement between the first and second portions). In these ways and others, one or more springs 334*b* may permit an increased range of relative movement between lens 306 and shroud 268 (e.g., in one or both of a longitudinal direction and a lateral direction, relative to the shroud), thereby facilitating removal of shroud assembly 264*b* from a light fixture. In the embodiment shown, each spring 334*b* is unitary and/or integrally formed with lens retaining cup 310*b*. In at least this way, shroud assembly 264*b* may provide for reduced manufacturing costs, assembly time, and/or complexity (e.g., by including a relatively small number of separate components).

Some embodiments of the present shroud assemblies (e.g., 264*a*, 264*b*, and/or the like) may include an O-ring, gasket, seal, and/or the like disposed or disposable around at least a portion of a shroud (e.g., 268) such that the shroud assembly may be sealingly coupled to and/or within a light fixture (e.g., to and/or within a base 14 and/or a mount 214 such that the O-ring, gasket, seal and/or the like contacts an interior surface of sidewall 18 and/or sidewall 158), thereby protecting fixture component(s) from moisture and/or contaminants. To illustrate, in this embodiment, shroud assembly 264*b* includes an O-ring 350 disposed or disposable within a groove 354 defined by an exterior portion of shroud 268.

Some embodiments of the present methods for removing a shroud assembly (e.g., 264*a*, 264*b*, and/or the like) from a light fixture (e.g., light fixture 10*a* or 10*b*, from base 14 and/or mount 214) comprise accessing a second end (e.g., 280) of a shroud (e.g., 268) through an interior passageway (e.g., 284) of the shroud by moving a lens (e.g., 306) that is coupled to the second end from a first position (e.g., FIG. 6F) to a second position (e.g., FIG. 6G) in which a portion of the lens is not in contact with the second end, and removing the shroud assembly from the light fixture, where the shroud comprises a sidewall (e.g., 272) extending between a first end (e.g., 276) and the second end to define the interior passageway.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A removable shroud assembly for a light fixture, the removable shroud assembly comprising:

a shroud having a sidewall extending between a first end and a second end to define an interior passageway, the first end defining an aperture;

a lens coupled to the second end of the shroud and accessible through the interior passageway, the lens movable from a first position to a second position in which a portion of the lens is not in contact with the second end of the shroud; and a lens retaining cup configured to locate the lens relative to the shroud when the lens is in the first position;

where the shroud assembly is configured such that the second end of the shroud is accessible through the interior passageway when the lens is in the second position.

2. The removable shroud assembly of claim 1, where the lens retaining cup is configured to overlie at least a portion of the sidewall when the lens is in the first position.

3. The removable shroud assembly of claim 1, where the lens is biased towards the first position.

4. The removable shroud assembly of claim 3, comprising one or more springs configured to bias the lens towards the first position.

5. The removable shroud assembly of claim 1, where:

the shroud comprises one or more projections extending from the sidewall and away from the interior passageway; and the one or more projections are configured to removably couple the shroud assembly to the light fixture.

6. The removable shroud assembly of claim 1, where the shroud comprises a circular cross-section.

7. The removable shroud assembly of claim 1, comprising a seal disposed around at least a portion of the shroud.

8. The removable shroud assembly of claim 7, where the seal is disposed within a groove defined by an exterior portion of the shroud.

9. The removable shroud assembly of claim 7, where the seal is configured to sealingly couple the shroud assembly and the light fixture.

10. A removable shroud assembly for a light fixture, the removable shroud assembly comprising:

a shroud having a sidewall extending between a first end and a second end to define an interior passageway, the first end defining an aperture; and a lens coupled to the second end of the shroud and accessible through the interior passageway, the lens movable from a first position to a second position in which a portion of the lens is not in contact with the second end of the shroud;

where the shroud assembly is configured such that the second end of the shroud is accessible through the interior passageway when the lens is in the second position; and where the light fixture comprises a recessed light fixture.

11. The removable shroud assembly of claim 10, where the lens is biased towards the first position.

12. The removable shroud assembly of claim 11, comprising one or more springs configured to bias the lens towards the first position.

13. The removable shroud assembly of claim 10, where:

the shroud comprises one or more projections extending from the sidewall and away from the interior passageway; and the one or more projections are configured to removably couple the shroud assembly to the light fixture.

14. The removable shroud assembly of claim 10, where the shroud comprises a circular cross-section.

15. The removable shroud assembly of claim 10, comprising a seal disposed around at least a portion of the shroud.

16. The removable shroud assembly of claim 15, where the seal is disposed within a groove defined by an exterior portion of the shroud.

17. The removable shroud assembly of claim 15, where the seal is configured to sealingly couple the shroud assembly and the light fixture.

18. A removable shroud assembly for a light fixture, the removable shroud assembly comprising:

a shroud having a sidewall extending between a first end and a second end to define an interior passageway, the first end defining an aperture;

a lens coupled to the second end of the shroud and accessible through the interior passageway, the lens movable from a first position to a second position in which a portion of the lens is not in contact with the second end of the shroud; and a seal disposed around at least a portion of the shroud, the seal being disposed within a groove defined by an exterior portion of the shroud;

where the shroud assembly is configured such that the second end of the shroud is accessible through the interior passageway when the lens is in the second position.

19. The removable shroud assembly of claim 18, where the lens is biased towards the first position.

20. The removable shroud assembly of claim 18, comprising one or more springs configured to bias the lens towards the first position.

* * * * *